United States Patent
Homma et al.

(10) Patent No.: US 10,641,598 B2
(45) Date of Patent: May 5, 2020

(54) HEIGHT AND DIMENSION MEASURING DEVICE THAT MEASURES A HEIGHT AND DIMENSION OF A MEASUREMENT OBJECT DISPOSED IN A MEASUREMENT REGION

(71) Applicant: Keyence Corporation, Osaka (JP)

(72) Inventors: Tatsuro Homma, Osaka (JP); Hiroyuki Satoyoshi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/808,915

(22) Filed: Nov. 10, 2017

(65) Prior Publication Data

US 2018/0180400 A1 Jun. 28, 2018

(30) Foreign Application Priority Data

Dec. 28, 2016 (JP) ................................ 2016-256615

(51) Int. Cl.
*G01B 9/02* (2006.01)
*G01B 11/02* (2006.01)
(Continued)

(52) U.S. Cl.
CPC .............. *G01B 9/02* (2013.01); *G01B 9/0209* (2013.01); *G01B 9/02044* (2013.01);
(Continued)

(58) Field of Classification Search
CPC .... G01B 9/02; G01B 9/0209; G01B 9/02044; G01B 11/24; G01B 11/02; G01B 2290/35;
(Continued)

(56) References Cited

U.S. PATENT DOCUMENTS

| 7,242,485 B2 | 7/2007 | Akishiba |
| 8,102,537 B2 | 1/2012 | Akishiba |

(Continued)

FOREIGN PATENT DOCUMENTS

| JP | 2010-043954 | 2/2010 |
| JP | 2014-085269 | 5/2014 |

OTHER PUBLICATIONS

U.S. Appl. No. 15/808,911, filed Nov. 10, 2017 (173 pages).
(Continued)

*Primary Examiner* — Hwa Andrew Lee
(74) *Attorney, Agent, or Firm* — Kilyk & Bowersox, PLLC

(57) ABSTRACT

To provide a three-dimensional measuring device capable of easily measuring a three-dimensional shape of a desired portion of a measurement object in a short time. Designation of a height measurement point and a dimension measurement portion by a user is received. An image of a measurement object S is acquired by an imaging section 220. Light emitted from the light emitting section 231 is deflected by the deflecting section 270 and irradiated on the measurement object S. Height of the portion of the measurement object S corresponding to the designated height measurement point is calculated on the basis of the light reception signal output from the light receiving section. A dimension of a portion of the measurement object S corresponding to the designated dimension measurement portion is calculated on the basis of the image acquired by the imaging section 220.

11 Claims, 23 Drawing Sheets

(51) Int. Cl.
*G01B 11/24* (2006.01)
*G01S 7/481* (2006.01)
*G02B 26/10* (2006.01)

(52) U.S. Cl.
CPC .............. *G01B 11/02* (2013.01); *G01B 11/24* (2013.01); *G01S 7/4817* (2013.01); *G01B 2290/35* (2013.01); *G02B 26/10* (2013.01); *G02B 26/101* (2013.01)

(58) Field of Classification Search
CPC ... G01B 11/005; G01S 7/4817; G02B 26/101; G02B 26/10
See application file for complete search history.

(56) References Cited

U.S. PATENT DOCUMENTS

| | | |
|---|---|---|
| 8,233,665 B2 | 7/2012 | Nakatsukasa |
| 8,503,758 B2 | 8/2013 | Naruse |
| 9,329,024 B2 | 5/2016 | Kawa |
| 2008/0118886 A1* | 5/2008 | Liang .................. A61B 5/0088 433/29 |
| 2010/0060903 A1 | 3/2010 | Nakatsukasa et al. |

OTHER PUBLICATIONS

U.S. Appl. No. 15/808,913, filed Nov. 10, 2017 (172 pages).
U.S. Appl. No. 15/808,914, filed Nov. 10, 2017 (182 pages).
U.S. Appl. No. 15/696,199, filed Sep. 6, 2017 (86 pages).

* cited by examiner

FIG. 8A  SETTING MODE
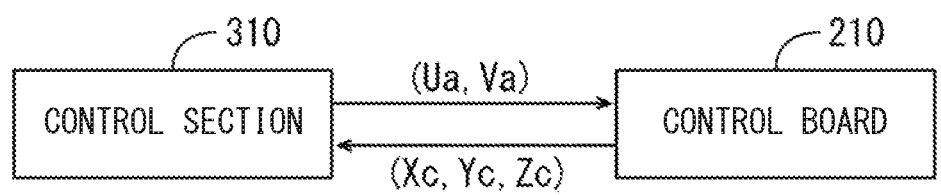
FIG. 8B  MEASUREMENT MODE
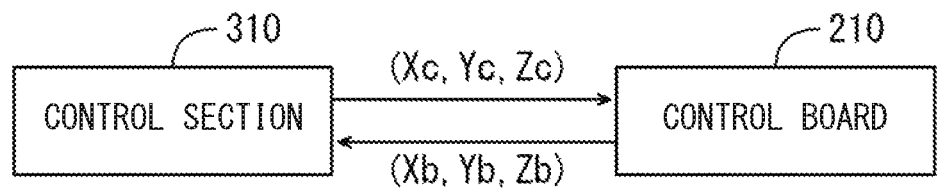

HEIGHT AND DIMENSION MEASURING DEVICE THAT MEASURES A HEIGHT AND DIMENSION OF A MEASUREMENT OBJECT DISPOSED IN A MEASUREMENT REGION

CROSS-REFERENCE TO RELATED APPLICATIONS

The present application claims foreign priority based on Japanese Patent Application No. 2016-256615, filed Dec. 28, 2016, the contents of which is incorporated herein by reference.

BACKGROUND OF THE INVENTION

1. Field of the Invention

The present invention relates to a three-dimensional measuring device that measures a surface shape of a measurement object.

2. Description of Related Art

A three-dimensional measuring device is used in order to measure a surface shape of a measurement object. For example, in a dimension measuring device described in JP-A-2014-85269, light irradiated from a low-coherence light source is split into measurement light and reference light by a beam splitter. The measurement light is irradiated on the surface of a measurement object by a measurement-object scanning optical system. The reference light is guided by a reference-light scanning optical system and reflected by a corner cube prism while an optical path length in the reference-light scanning optical system being changed. A surface position of a measurement point of the measurement object is calculated on the basis of interference of the measurement light reflected by the measurement object and the reference light reflected by the corner cube prism.

SUMMARY OF THE INVENTION

In the dimension measuring device explained above, every time the measurement light is deflected in one direction by the measurement-object scanning optical system, the measurement object is sent at a predetermined movement amount in a direction orthogonal to a deflecting direction. Consequently, the dimension of the surface of the measurement object is measured.

However, in the method explained above, even when it is desired to measure the height, the width, and the length of a desired portion of the measurement object, it is necessary to measure the dimension of the entire surface of the measurement object. Therefore, the measurement of the dimension takes time depending on the shape and the size of the measurement object. A measurement operator needs to extract information concerning a desired measurement point out of all measurement points of the measurement object. Such extraction work is complicated.

An object of the present invention is to provide a three-dimensional measuring device capable of easily measuring a three-dimensional shape of a desired portion of a measurement object in a short time.

(1) A three-dimensional measuring device according to the present invention is a three-dimensional measuring device that measures a dimension of a measurement object disposed in a measurement region, the three-dimensional measuring device including: a height-measurement-information acquiring section configured to receive designation of a height measurement point; a dimension-measurement-information acquiring section configured to receive designation of a dimension measurement portion for measuring a dimension in a direction orthogonal to a height direction; an imaging section configured to acquire an image of the measurement object disposed in the measurement region; a light emitting section configured to emit first light; a deflecting section configured to deflect the first light emitted from the light emitting section and irradiate the first light on the measurement object; a light receiving section configured to receive the first light from the measurement object and output a light reception signal indicating a received light amount; a driving control section configured to control the deflecting section to irradiate the first light on a portion of the measurement object corresponding to the height measurement point received by the height-measurement-information acquiring section; a height calculating section configured to calculate height of the portion of the measurement object corresponding to the height measurement point on the basis of the light reception signal output by the light receiving section; and a dimension calculating section configured to calculate, on the basis of the image of the measurement object acquired by the imaging section, a dimension of a portion of the measurement object corresponding to the dimension measurement portion received by the dimension-measurement-information acquiring section.

In the three-dimensional measuring device, the designation of the height measurement point is received by the height-measurement-information acquiring section and the designation of the dimension measurement portion is received by the dimension-measurement-information acquiring section. The image of the measurement object disposed in the measurement region is acquired by the imaging section.

The first light emitted from the light emitting section is deflected by the deflecting section and irradiated on the measurement object. The deflecting section is controlled by the driving control section to irradiate the light on the portion of the measurement object corresponding to the height measurement point. The first light from the measurement object is received by the light receiving section and the light reception signal indicating the received light amount is output. The height of the portion of the measurement object corresponding to the height measurement point is calculated by the height calculating section on the basis of the light reception signal output by the light receiving section. The dimension of the portion of the measurement object corresponding to the dimension measurement portion received by the dimension-measurement-information acquiring section is calculated by the dimension calculating section on the basis of the image of the measurement object acquired by the imaging section.

With the configuration explained above, an operator designates a desired height measurement point, whereby the height of a portion of the measurement object corresponding to the designated height measurement point is selectively measured. The operator designates a desired dimension measurement portion, whereby the dimension of a portion of the measurement object corresponding to the designated dimension measurement portion is selectively measured. Therefore, it is unnecessary to measure the height of the entire surface of the measurement object in order to measure a three-dimensional shape of a desired portion of the measurement object. Therefore, it is also unnecessary to extract a necessary measurement value from a plurality of measurement values of heights. As a result, it is possible to easily measure the three-dimensional shape of the desired portion of the measurement object in a short time.

(2) The three-dimensional measuring device may further include: an illuminating section configured to irradiate second light on the measurement region; and a telecentric optical system configured to guide the second light from the measurement region to the imaging section.

In this case, the second light irradiated on the measurement region from the illuminating section is made incident on the imaging section through the telecentric optical system. Consequently, an image of the measurement object is obtained. In this case, the size and the shape of the cross section of the second light made incident on the imaging section through the telecentric optical system do not change according to a position in the optical axis direction of the telecentric optical system. Therefore, it is possible to accurately calculate the dimension of the designated dimension measurement portion irrespective of the height of the measurement object disposed in the measurement region.

(3) The three-dimensional measuring device may further includes a detecting section configured to detect information concerning the deflection of the deflecting section or an irradiation position of the first light on the image acquired by the imaging section, the height calculating section may calculate height of the portion of the measurement object corresponding to the height measurement point on the basis of the information concerning the deflection or the irradiation position of the first light on the image detected by the detecting section in addition to the light reception signal output by the light receiving section.

In this case, the information concerning the deflection of the deflecting section or the irradiation position of the first light on the image acquired by the imaging section is detected by the detecting section. The height of the portion of the measurement object corresponding to the height measurement point is calculated on the basis of the information concerning the deflection or the irradiation position of the first light on the image detected by the detecting section and the light reception signal output by the light receiving section. Consequently, it is possible to highly accurately calculate the height of the portion of the measurement object.

(4) The deflecting section may include: a first reflecting member configured to reflect the first light emitted from the light emitting section; a second reflecting member configured to reflect the first light reflected by the first reflecting member and guide the first light to the telecentric optical system; and rotating sections configured to respectively rotate the first and second reflecting members. The information concerning the deflection is deflecting directions of the first light by the first and second reflecting members. The three-dimensional measuring device may further include an optical member configured to convert a traveling direction of the first light deflected by the first and second reflecting members into a direction parallel to an optical axis of the telecentric optical system and guide the first light to the telecentric optical system.

In this case, the first light emitted from the light emitting section is accurately deflected by the first and second reflecting members in a shorter time. The traveling direction of the first light irradiated on the measurement object from the telecentric optical system is parallel to the optical axis of the telecentric optical system. Therefore, the first light is irradiated on the measurement object in a fixed direction irrespective of a position of the height measurement point.

(5) The deflecting section may include: a supporting member; a first reflecting member supported by the supporting member to be capable of moving in a first direction crossing an optical axis of the telecentric optical system and configured to reflect the first light emitted from the light emitting section; a second reflecting member supported by the supporting member to be capable of moving in a second direction crossing the optical axis of the telecentric optical system and different from the first direction and configured to reflect the first light reflected by the first reflecting member to a direction parallel to the optical axis of the telecentric optical system and guide the first light to the telecentric optical system; and moving sections configured to move the first and second reflecting members respectively in the first direction and the second direction. The information concerning the deflection may include a relative position in the first direction of the first reflecting member with respect to the supporting member and a relative position in the second direction of the second reflecting member with respect to the supporting member.

In this case, the first light emitted from the light emitting section is deflected by the first and second reflecting members. The traveling direction of the first light irradiated on the measurement object from the telecentric optical system is parallel to the optical axis of the telecentric optical system. Therefore, the first light is irradiated on the measurement object in a fixed direction irrespective of the position of the height measurement point.

(6) The three-dimensional measuring device may further include a placement table. The placement table may include a translucent placement plate on which the measurement object is placed. The measurement region may be a space on the placement plate. The telecentric optical system may be provided above the placement plate to be opposed to the measurement region. The illuminating section may irradiate the second light to travel from a position below the placement table toward the telecentric optical system through the placement plate and the measurement region.

In this case, a portion passing a region other than the measurement object in the second light made incident on the measurement region from the illuminating section is made incident on the imaging section. Consequently, in the image acquired by the imaging section, an edge portion representing the outer edge of the measurement object clearly appears. Therefore, it is possible to more accurately calculate the dimension of the designated dimension measurement portion.

(7) The translucent placement plate may be glass. In this case, it is possible to further planarize the placement surface of the measurement object by using the glass as the placement plate. Therefore, it is possible to highly accurately calculate the height of the portion of the measurement object.

(8) Wavelengths of the first and second lights may be different from each other. In this case, the light receiving section and the imaging section respectively receive the first and second lights having the wavelengths different from each other, whereby it is possible to execute the calculation of the height and the calculation of the dimension in parallel.

(9) The three-dimensional measuring device may be configured to selectively operate in a setting mode and a measurement mode and may further include: a reference-image acquiring section configured to acquire, in the setting mode, as a reference image, the image of the measurement object acquired by the imaging section; a measurement-image acquiring section configured to acquire, in the measurement mode, as a measurement image, the image of the measurement object acquired by the imaging section; a registering section; and a correcting section. The heightmeasurement-information acquiring section may receive, in the setting mode, designation of a height measurement point on the reference image acquired by the reference-image acquiring section. The dimension-measurement-information acquiring section may receive, in the setting mode, designation of a dimension measurement portion on the reference image acquired by the reference-image acquiring section. The registering section may register, in the setting mode, the reference image acquired by the reference-image acquiring section, the height measurement point received by the height-measurement-information acquiring section, and the dimension measurement portion received by the dimension-measurement-information acquiring section in association with one another. In the measurement mode, the correcting section may specify, as a corrected height measurement point, a position on the measurement image corresponding to the height measurement point on the reference image and specify, as a corrected dimension measurement portion, a position on the measurement image corresponding to the dimension measurement portion on the reference image on the basis of comparison of the reference image registered by the registering section and the measurement image acquired by the measurement-image acquiring section. The driving control section may control, in the measurement mode, the deflecting section to irradiate the first light on a portion of the measurement object corresponding to the corrected height measurement point. The detecting section may detect, in the measurement mode, information concerning the deflection of the deflecting section or an irradiation position of the first light on the image acquired by the imaging section. The height calculating section may calculate, in the measurement mode, height of the portion of the measurement object corresponding to the corrected height measurement point. The dimension calculating section may calculate, in the measurement mode, a dimension of the portion of the measurement object corresponding to the corrected dimension measurement portion.

In this case, the three-dimensional measuring device selectively operates in the setting mode and the measurement mode. In the setting mode, the reference image indicating the measurement object is acquired by the reference-image acquiring section. The designation of the height measurement point on the reference image is received by the height-measurement-information acquiring section. The designation of the dimension measurement portion on the reference image is received by the dimension-measurement information acquiring section. The reference image acquired by the reference-image acquiring section, the height measurement point received by the height-measurement-information acquiring section, and the dimension measurement portion received by the dimension-measurement-information acquiring section are registered by the registering section in association with one another.

In the measurement mode, the measurement image indicating the measurement object is acquired by the measurement-image acquiring section. The position on the measurement image corresponding to the height measurement point on the reference image is specified as the corrected height measurement point by the correcting section on the basis of the comparison of the reference image registered by the registering section and the measurement image acquired by the measurement-image acquiring section. The position on the measurement image corresponding to the dimension measurement portion on the reference image is specified as the corrected dimension measurement portion by the correcting section. The deflecting section is controlled by the driving control section to irradiate the first light on the portion of the measurement object corresponding to the specified corrected height measurement point. The dimension of the portion of the measurement object corresponding to the specified corrected dimension measurement portion is calculated.

With this configuration, the operator can designate, in the setting mode, the height measurement point and the dimension measurement portion on the reference image of the measurement object. In the measurement mode, the height of the portion of the measurement object corresponding to the height measurement point designated on the reference image is automatically calculated and the dimension of the portion of the measurement object corresponding to the dimension measurement portion designated on the reference image is automatically calculated. Therefore, a skilled operator designates the height measurement point and the dimension measurement portion on the reference image of the measurement object in the setting mode, whereby, in the measurement mode, even when the operator is not skilled, it is possible to uniformly acquire a calculation result of the height and the dimension of the corresponding portion of the measurement object. Consequently, it is possible to accurately and easily measure the shape of a desired portion of the measurement object.

(10) The three-dimensional measuring device may further include: an allowable-value acquiring section configured to, in the setting mode, receive an input of an allowable value of the height of the portion of the measurement object corresponding to the height measurement point, receive an input of an allowable value of the dimension of the measurement object corresponding to the dimension measurement portion, and cause the registering section to register the received allowable values respectively in association with the height measurement point and the dimension measurement portion; and an inspecting section configured to determine, in the measurement mode, pass/fail of the measurement object on the basis of the height of the portion of the measurement object calculated by the height calculating section and the dimension of the measurement object calculated by the dimension calculating section and the allowable values registered by the registering section.

In this case, in the setting mode, the allowable value of the height of the portion of the measurement object corresponding to the height measurement point is registered by the registering section and the allowable value of the dimension of the measurement object corresponding to the dimension measurement portion is registered by the registering section. In the measurement mode, pass/fail of the measurement object is determined by the inspecting section on the basis of the allowable values registered by the registering section. Therefore, in the setting mode, the skilled worker inputs the allowable value of the height of the portion of the measurement object corresponding to the height measurement point and inputs the allowable value of the dimension of the measurement object corresponding to the dimension measurement portion, whereby, in the measurement mode, even when the operator is not skilled, it is possible to uniformly acquire a determination result of pass/fail of the measurement object. Consequently, it is possible to accurately and easily inspect the measurement object.

(11) The correcting section may specify the corrected height measurement point and the corrected dimension measurement portion on the basis of comparison of a shape of an edge portion of the measurement object indicated by the reference image and a shape of an edge portion of the measurement object indicated by the measurement image.

In this case, the correcting section can highly accurately specify the corrected height measurement point and the corrected dimension measurement portion.

(12) The height-measurement-information acquiring section may superimpose and display, on the reference image acquired by the reference-image acquiring section, an indicator indicating a position of the received height measurement point and an indicator indicating the received dimension measurement portion.

In this case, the operator can easily confirm the designated height measurement point and the designated dimension measurement portion by visually recognizing the indicators superimposed and displayed on the reference image of the measurement object.

(13) The three-dimensional measuring device may further include: a geometric-element acquiring section configured to receive, in the setting mode, designation of a geometric element concerning a position of the height measurement point and cause the registering section to register the received geometric element in association with the height measurement point; and a geometric-element calculating section configured to calculate, in the measurement mode, on the basis of the information concerning the deflection of the deflecting section detected by the detecting section or the irradiation position of the first light on the image acquired by the imaging section, a value of the geometric element concerning a position of the corrected height measurement point corresponding to the geometric element registered in the registering section.

In this case, in the setting mode, the geometric element concerning a position of the height measurement point on the image of the measurement object is registered by the registering section. In the measurement mode, the geometric element of the measurement object corresponding to the registered geometric element is automatically calculated. Therefore, the skilled operator designates, in the setting mode, the geometric element concerning the position of the height measurement point on the image of the measurement object, whereby, in the measurement mode, even when the operator is not skilled, it is possible to uniformly acquire a calculation result of the geometric element of the corresponding portion of the measurement object. Consequently, it is possible to accurately and easily measure various geometric elements including flatness and an assembling dimension of the measurement object.

(14) The height-measurement-information acquiring section may further receive, in the setting mode, designation of one or a plurality of reference points on the reference image of the measurement object acquired by the reference-image acquiring section. The registering section may register the one or plurality of reference points received by the height-measurement-information acquiring section in association with the reference image and the height measurement point. The correcting section may specify, in the measurement mode, on the basis of comparison of the reference image registered by the registering section and the measurement image acquired by the measurement-image acquiring section, positions of the measurement image respectively corresponding to the one or plurality of reference points on the reference image as one or a plurality of corrected reference points. The driving control section may control, in the measurement mode, the deflecting section to irradiate the first light on a portion or portions of the measurement object corresponding to the one or plurality of corrected reference points specified by the correcting section. The three-dimensional measuring device may further include: a coordinate calculating section configured to calculate, in the measurement mode, on the basis of a detection result of the detecting section and the light reception signal output by the light receiving section, a coordinate corresponding to the position on the image received by the height-measurement-information acquiring section; and a reference-plane acquiring section configured to acquire, in the measurement mode, a reference plane on the basis of a coordinate or coordinates corresponding to the one or plurality of corrected reference points calculated by the coordinate calculating section. The height calculating section may calculate, in the measurement mode, on the basis of a coordinate corresponding to the height measurement point calculated by the coordinate calculating section, height of a portion of the measurement object based on the reference plane acquired by the reference-plane acquiring section.

In this case, the operator in the setting mode can easily designate the reference plane serving as a reference of the height of the measurement object in the measurement mode by designating the one or plurality of reference points on the image of the measurement object. Consequently, in the measurement mode, it is possible to acquire relative height of a portion of the measurement object corresponding to a desired reference plane.

According to the present invention, it is possible to easily measure a three-dimensional shape of a desired portion of the measurement object in a short time.

BRIEF DESCRIPTION OF THE DRAWINGS

FIGS. 8A and 8B are diagrams showing contents of data transmitted between a control section and a control board in order to measure the height of the surface of a measurement object in operation modes.

DESCRIPTION OF EMBODIMENTS (1) Overall Configuration of a Three-Dimensional Measuring Device A three-dimensional measuring device according to an embodiment of the present invention is explained below with reference to the drawings. FIG. 1 is a block diagram showing an overall configuration of the three-dimensional measuring device according to the embodiment of the present invention. As shown in FIG. 1, a three-dimensional measuring device 400 includes a stand section 100, a measurement head 200, and a processing device 300.

The stand section 100 includes a setting section 110, a holding section 120, and a lift 130. The setting section 110 has a substantially rectangular parallelepiped shape and is placed on a setting surface. A translucent placement plate 111, on which a measurement object S (FIG. 1) is placed, is provided on the upper surface of the setting section 110. In this embodiment, a transparent glass plate is used as the placement plate 111. A measurement region V, where the measurement object S can be measured by the measurement head 200, is defined above the placement plate 111. In FIG. 1, the measurement region V is indicated by an alternate long and two short dashes line. On the inside of the setting section 110, a transmission illumination section 190 is provided in a position below the placement plate 111. The transmission illumination section 190 irradiates light from below the placement plate 111 toward the measurement region V. In the following explanation, the light irradiated on the measurement region V from the transmission illumination section 190 is referred to as first illumination light.

Figure 1:
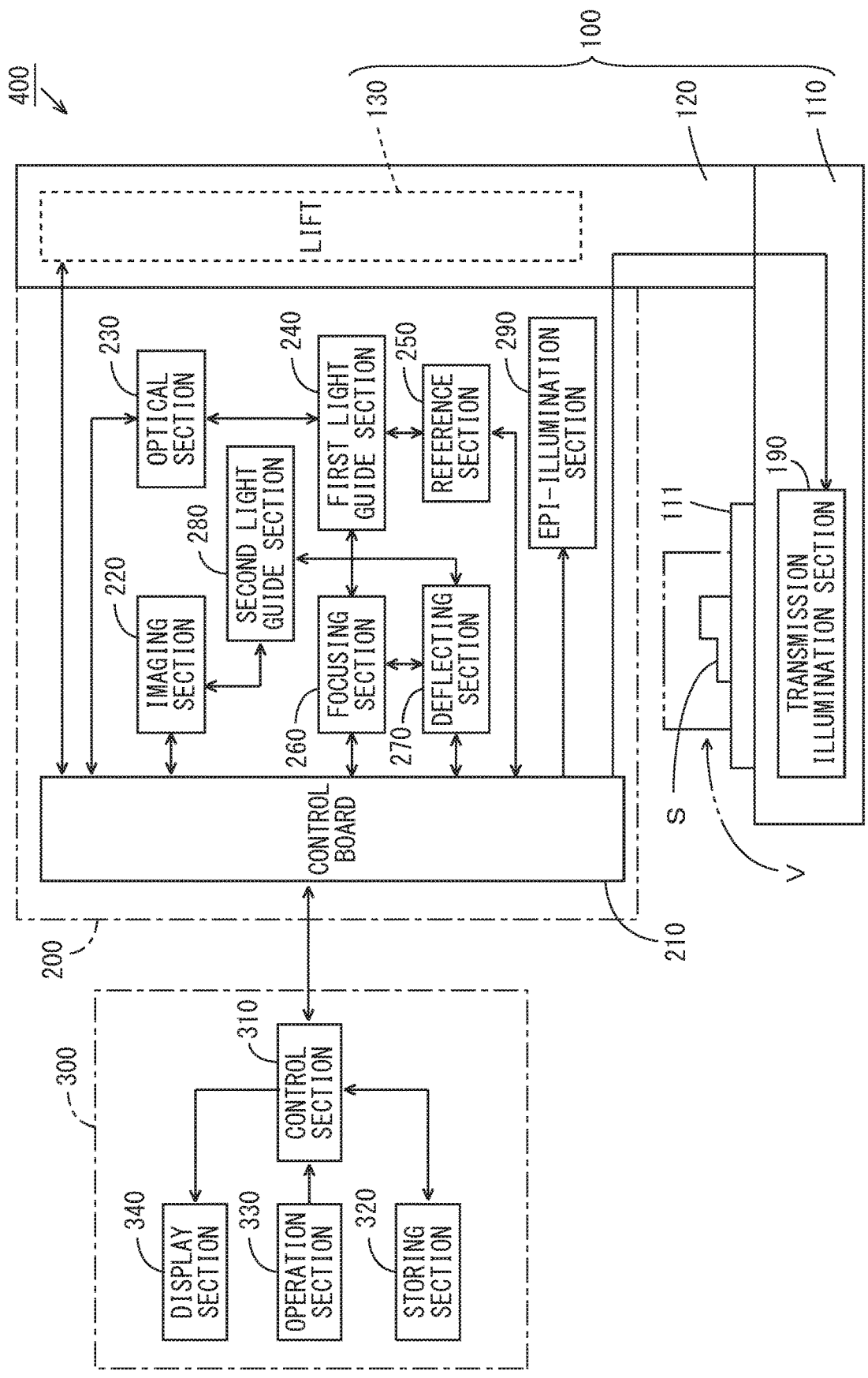
FIG. 1 is a block diagram showing an overall configuration of a three-dimensional measuring device according to an embodiment of the present invention.

The holding section 120 is provided to extend upward from one end portion of the setting section 110. The measurement head 200 is attached to the upper end portion of the holding section 120 to be opposed to the placement plate 111. In this case, since the measurement head 200 and the setting section 110 are held by the holding section 120, it is easy to handle the three-dimensional measuring device 400. By placing the measurement object S on the placement plate 111 on the setting section 110, it is possible to easily locate the measurement object S in the measurement region V.

The lift 130 is provided on the inside of the holding section 120. The lift 130 can move the measurement head 200 in the up-down direction (the height direction of the measurement object S) with respect to the measurement object S on the placement plate 111. The measurement head 200 includes a control board 210, an imaging section 220, an optical section 230, a first light guide section 240, a reference section 250, a focusing section 260, a deflecting section 270, a second light guide section 280, and an epi-illumination section 290. The control board 210 includes, for example, a CPU (central processing unit), a ROM (read only memory), and a RAM (random access memory). The control board 210 may be configured by a microcomputer.

The control board 210 is connected to the processing device 300. The control board 210 controls the operations of the lift 130, the transmission illumination section 190, the imaging section 220, the optical section 230, the reference section 250, the focusing section 260, the deflecting section 270, and the epi-illumination section 290 on the basis of commands by the processing device 300. The control board 210 gives various kinds of information acquired from the imaging section 220, the optical section 230, the reference section 250, the focusing section 260, and the deflecting section 270 to the processing device 300. The epi-illumination section 290 irradiates light on the measurement region V from above. In the following explanation, the light irradiated on the measurement region V from the epi-illumination section 290 is referred to as second illumination light. The second light guide section 280 guides the first and second illumination lights passed the measurement region V or reflected in the measurement region V to the imaging section 220. The imaging section 220 includes, for example, a CCD (charge coupled device) camera or a CMOS (complementary metal oxide semiconductor) image sensor. The imaging section 220 receives the first and second illumination lights from the second light guide section 280, images the measurement object S placed on the placement plate 111 to thereby generate image data of the measurement object S, and gives the generated image data to the control board 210.

The optical section 230 emits emission light having temporally low coherence to the first light guide section 240. The first light guide section 240 divides the emission light from the optical section 230 into reference light and measurement light, guides the reference light to the reference section 250, and guides the measurement light to the focusing section 260. The reference section 250 reflects the reference light to the first light guide section 240. The focusing section 260 focuses the measurement light that passes through the focusing section 260. In the present invention, changing a traveling direction of the measurement light emitted from the focusing section 260 to a direction different from an emitting direction of the measurement light is referred to as deflection. The deflecting section 270 deflects the measurement light focused by the focusing section 260. At this point, the second light guide section 280 irradiates the measurement light deflected by the deflecting section 270 on the measurement object S disposed in the measurement region V.

A part of the measurement light irradiated on the measurement object S is reflected by the measurement object S and guided to the first light guide section 240 through the second light guide section 280, the deflecting section 270, and the focusing section 260. The first light guide section 240 generates interference light of the reference light reflected by the reference section 250 and the measurement light reflected by the measurement object S and guides the interference light to the optical section 230. The optical section 230 detects a received light amount for each of wavelengths of the interference light and gives a signal indicating a result of the detection to the control board 210. Details of the measurement head 200 are explained below.

The processing device 300 includes a control section 310, a storing section 320, an operation section 330, and a display section 340. The control section 310 includes, for example, a CPU. The storing section 320 includes, for example, a ROM, a RAM, and a HDD (hard disk drive). A system program is stored in the storing section 320. The storing section 320 is used for storage of various data and processing of the data.

The control section 310 gives, on the basis of a system program stored in the storing section 320, commands for controlling the operations of the imaging section 220, the optical section 230, the reference section 250, the focusing section 260, the deflecting section 270, the epi-illumination section 290, and the transmission illumination section 190 provided in the measurement head 200 and the stand 100 to the control board 210. The control section 310 acquires various kinds of information from the control board 210 of the measurement head 200 and causes the storing section 320 to store the various kinds of information.

The operation section 330 includes a pointing device such as a mouse, a touch panel, a trackball, or a joystick and a keyboard. The operation section 330 is operated by a user in order to give an instruction to the control section 310. The display section 340 includes, for example, an LCD (liquid crystal display) panel or an organic EL (electroluminescence) panel. The display section 340 displays an image based on image data stored in the storing section 320, a measurement result, and the like.

Figure 2:
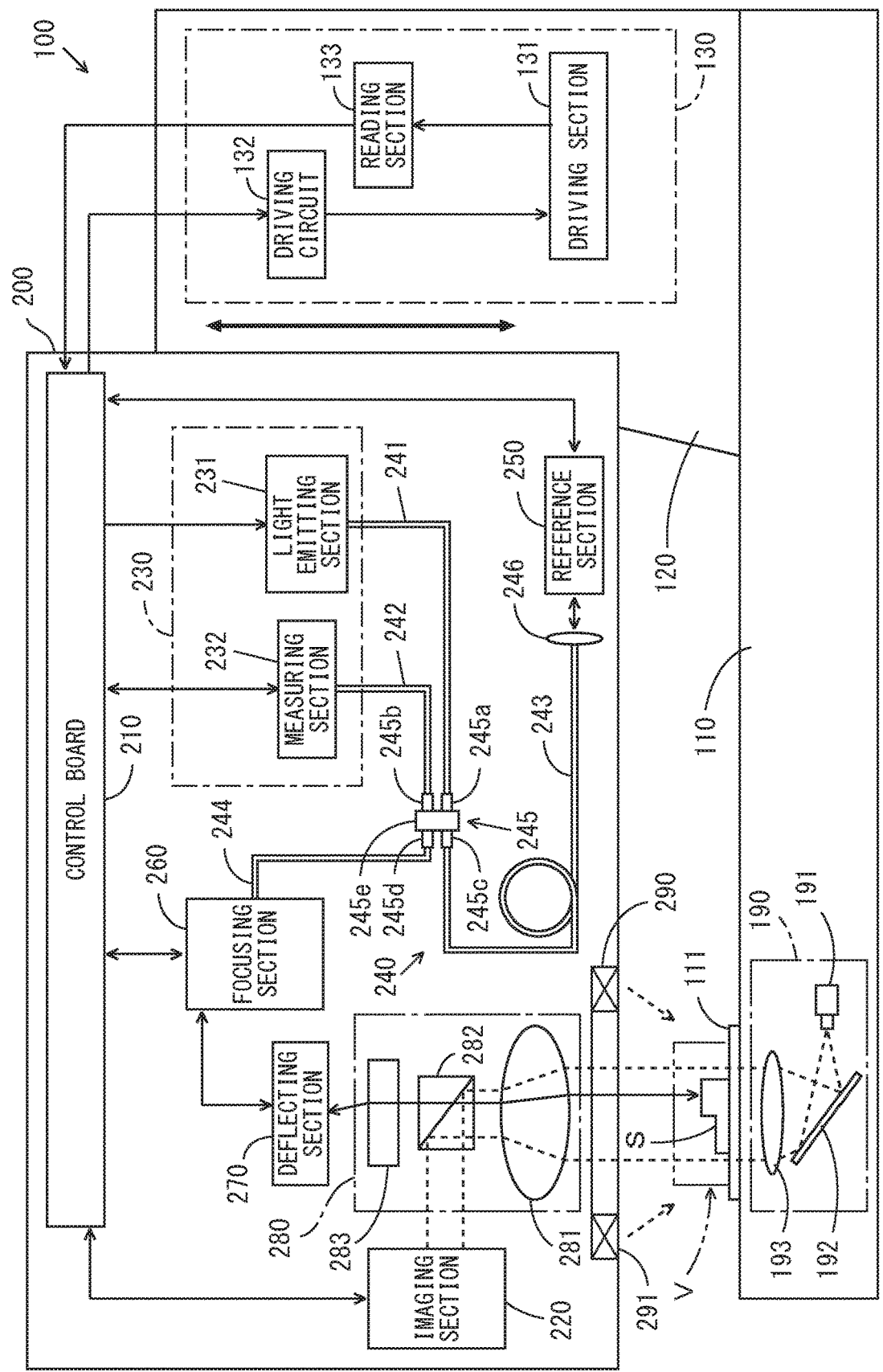
FIG. 2 is a block diagram showing the configuration of a part t of a stand section and a measurement head.

(2) Details of a Part of the Components in the Stand Section and the Measurement Head FIG. 2 is a block diagram showing the configuration of a part of the stand section 100 and the measurement head 200 in detail. Specifically, in FIG. 2, detailed configurations of the lift 130, the transmission illumination section 190, the optical section 230, the first light guide section 240, the second light guide section 280, and the epi-illumination section 290 are shown. In FIG. 2, as in FIG. 1, the measurement region V is indicated by an alternate long and two short dashes line.

As shown in FIG. 2, the lift 130 includes a driving section 131, a driving circuit 132, and a reading section 133. The driving section 131 is, for example, a motor. As indicated by a thick arrow in FIG. 2, the driving section 131 moves the measurement head 200 in the up-down direction with respect to the measurement object S on the placement plate 111. Consequently, it is possible to adjust an optical path length of measurement light over a wide range. The optical path length of the measurement light is the length of an optical path from the time when the measurement light is output from a port 245d of the first light guide section 240 explained below until the measurement light reflected by the measurement object S is input to the port 245d.

The driving circuit 132 is connected to the control board 210. The driving circuit 132 drives the driving section 131 on the basis of the control by the control board 210. The reading section 133 is, for example, an optical linear encoder. The reading section 133 reads a driving amount of the driving section 131 to thereby detect a position in the up-down direction of the measurement head 200. The reading section 133 gives a result of the detection to the control board 210.

The optical section 230 includes a light emitting section 231 and a measuring section 232. The light emitting section 231 includes, for example, an SLD (super luminescent diode) as a light source and emits emission light having relatively low coherency. Specifically, the coherency of the emission light is higher than the coherency of light or white light emitted by an LED (light emitting diode) and lower than the coherency of laser light. Therefore, the emission light has a wavelength band width smaller than the wavelength band width of the light or the white light emitted by the LED and larger than the wavelength band width of the laser light. The emission light from the optical section 230 is input to the first light guide section 240.

Figure 3:
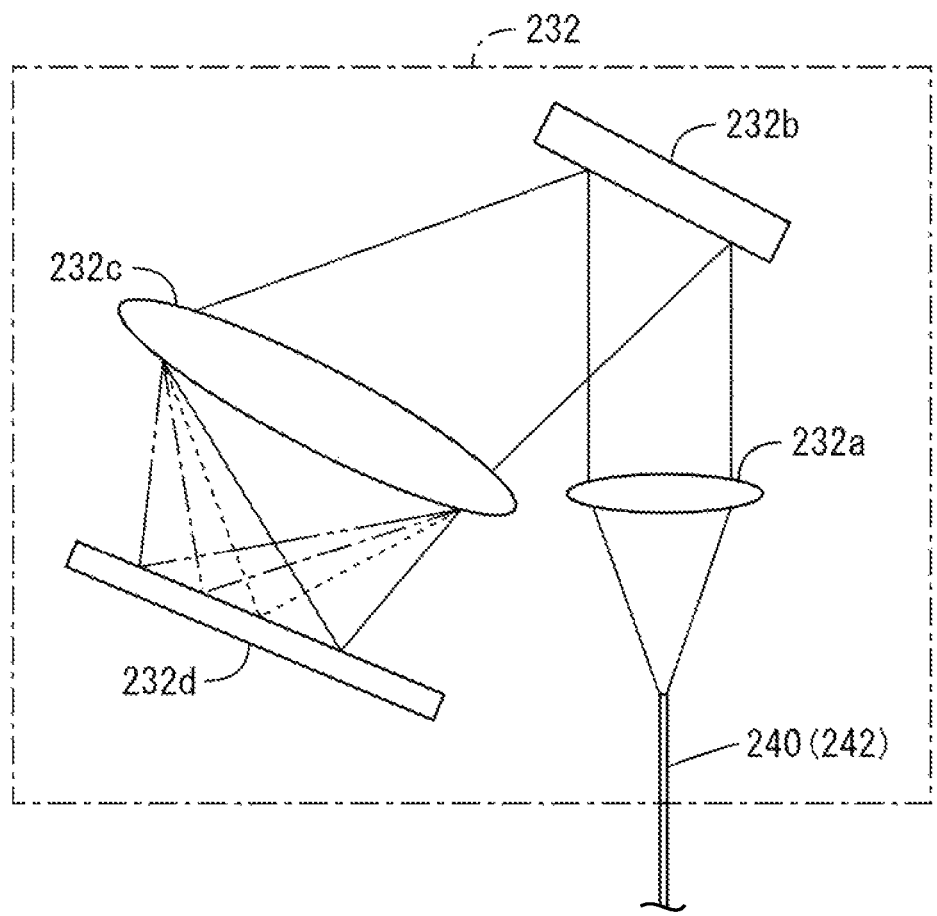
FIG. 3 is a schematic diagram showing the configuration of a measuring section.

The interference light is output to the measurement section 232 from the first light guide section 240. FIG. 3 is a schematic diagram showing the configuration of the measuring section 232. As shown in FIG. 3, the measurement section 232 includes lenses 232a and 232c, a spectral section 232b, and a light receiving section 232d. Interference light output from an optical fiber 242 of the first light guide section 240 explained below passes through the lens 232a to thereby be substantially collimated and made incident on the spectral section 232b. The spectral section 232b is, for example, a reflective diffraction grating. Light made incident on the spectral section 232b is spectrally dispersed to reflect at angles different for each of wavelengths and passes through the lens 232c to thereby be focused on one-dimensional positions different for each of the wavelengths.

The light receiving section 232d includes, for example, an imaging element (a one-dimensional line sensor) in which a plurality of pixels are one-dimensionally arrayed. The imaging element may be a multi-division PD (photodiode), a CCD (charge coupled device) camera, or a CMOS (complementary metal oxide semiconductor) image sensor or may be other elements. The light receiving section 232d is disposed such that a plurality of pixels of the imaging element respectively receive lights in a different focusing positions different for each of wavelengths formed by the lens 232c.

Analog electric signals (hereinafter referred to as light reception signals) corresponding to a received light amount are output from the pixels of the light receiving section 232d and given to the control board 210 shown in FIG. 2. Consequently, the control board 210 acquires data indicating a relation between the pixels of the light receiving section 232d (the wavelength of interference light) and the received light amount. The control board 210 performs a predetermined arithmetic operation and predetermined processing on the data to thereby calculate height of a portion of the measurement object S.

As shown in FIG. 2, the first light guide section 240 includes four optical fibers 241, 242, 243, and 244, a fiber coupler 245, and a lens 246. The fiber coupler 245 has a so-called 2×2 configuration and includes four ports 245a, 245b, 245c, and 245d and a main body section 245e. The ports 245a and 245b and the ports 245c and 245d are provided in the main body section 245e to be opposed to each other across the main body section 245e.

The optical fiber 241 is connected between the light emitting section 231 and the port 245a. The optical fiber 242 is connected between the measuring section 232 and the port 245b. The optical fiber 243 is connected between the reference section 250 and the port 245c. The optical fiber 244 is connected between the focusing section 260 and the port 245d. Note that, in this embodiment, the optical fiber 243 is longer than the optical fibers 241, 242, and 244. The lens 246 is disposed on an optical path of the optical fiber 243 and the reference section 250.

Emission light from the light emitting section 231 is divided by the first light guide section 240 and output as measurement light and reference light. Specifically, the emission light from the light emitting section 231 is input to the port 245a through the optical fiber 241. A part of the emission light input to the port 245a is output from the port 245c as reference light. The reference light passes through the optical fiber 243 and the lens 246 to thereby be substantially collimated and guided to the reference section 250. The reference light reflected by the reference section 250 is input to the port 245c through the lens 246 and the optical fiber 243.

Another part of the emission light input to the port 245a is output from the port 245d as measurement light. The measurement light is irradiated on the measurement object S through the optical fiber 244, the focusing section 260, the deflecting section 270, and the second light guide section 280. A part of the measurement light reflected by the measurement object S is input to the port 245d through the second light guide section 280, the deflecting section 270, the focusing section 260, and the optical fiber 244.

Interference light is generated by the reference light returning from the reference section 250 and input to the port 245c and the measurement light returning from the measurement object S and input to the port 245d. The generated interference light is output from the port 245b and guided to the measuring section 232 through the optical fiber 242.

The transmission illumination section 190 is provided in a position below the placement plate 111 and includes a light source 191, a mirror 192, and a collimate lens 193. The light source 191 emits first illumination light having a wavelength different from the wavelengths of the measurement light and the reference light explained above to the mirror 192. The mirror 192 reflects the first illumination light from the light source 191 toward the measurement region V on the placement plate 111. The first illumination light reflected by the mirror 192 is converted into parallel light orthogonal to the placement plate 111 by the collimate lens 193 and guided to the measurement region V through the placement plate 111.

A part of the first illumination light guided from the transmission illumination section 190 to the measurement region V is reflected downward by the measurement object S and blocked. On the other hand, the remainder of the first illumination light guided from the transmission illumination section 190 to the measurement region V passes through a portion other than the measurement object S in the measurement region V to be made incident on a telecentric optical system 281 of the second light guide section 280.

The epi-illumination section 290 is provided on the bottom of the measurement head 200 to be opposed to a region surrounding the center of the measurement region V. The epi-illumination section 290 includes an illumination light emission port 291 having an annular shape. The illumination light emission port 291 is provided to surround a space above the center of the measurement region V. The illumination light emission port 291 irradiates second illumination light having the same wavelength as the wavelength of the first illumination light toward the center of the measurement region V. A part of the second illumination light irradiated from the illumination light emission port 291 toward the measurement region V is reflected upward by the measurement object S and made incident on a telecentric optical system 281 of the second light guide section 280 explained below.

The second light guide section 280 is provided to be opposed to the center of the measurement region V on the inside of the measurement head 200 and includes a telecentric optical system 281, a half mirror 282, and a collimate lens 283.

The telecentric optical system 281 is a both-side telecentric optical system having telecentric structures on an object side and an image side and includes, for example, one or a plurality of lenses. The telecentric optical system 281 functions as an objective lens and is provided such that the optical axis of the telecentric optical system 281 is orthogonal to the placement plate 111. The half mirror 282 is provided above the telecentric optical system 281 to be located on the optical axis of the telecentric optical system 281. Further, the collimate lens 283 is provided above the half mirror 282.

The telecentric optical system 281 guides the first and second illumination lights emitted by the transmission illumination section 190 and the epi-illumination section 290 and made incident from the measurement region V to the half mirror 282 while condensing the first and second illumination lights. The half mirror 282 reflects a part of the first and second illumination lights made incident from the measurement region V through the telecentric optical system 281 to the imaging section 220. Consequently, the imaging section 220 images the measurement object S disposed in the measurement region V.

The size and the shape of the cross section of the first illumination light captured into the telecentric optical system 281 from the transmission illumination section 190 through the measurement region V are fixed in any position of a traveling direction of the first illumination light. Therefore, in an image acquired by the imaging section 220, the size and the shape of a shadow (a shadow representing the external shape of the measurement object S) generated by light blocking of the measurement object S do not change according to the height of the measurement object S.

In the telecentric optical system 281, only a component parallel to the optical axis of the telecentric optical system 281 in the second illumination light reflected by the measurement object S in the measurement region V is captured. Consequently, the size and the shape of the cross section of the second illumination light reflected by the measurement object S in the measurement region V and captured into the telecentric optical system 281 are also fixed in any position of a traveling direction of the second illumination light. Therefore, in the image acquired by the imaging section 220, the size and the shape of an image representing a surface shape of the measurement object S do not change according to the height of the measurement object S.

The collimate lens 283 converts a traveling direction of the measurement light, which is emitted from the deflecting section 270 while being deflected as explained below, into a direction parallel to the optical axis of the telecentric optical system 281 and guides the measurement light, the traveling direction of which is converted, to the telecentric optical system 281 through the half mirror 282. Consequently, the measurement light emitted from the deflecting section 270 is irradiated on the measurement object S through the second guide light section 280. In this case, apart of the measurement light reflected by the measurement object S returns to the deflecting section 270 through the telecentric optical system 281, the half mirror 282, and the collimate lens 283.

The imaging section 220 according to this embodiment is capable of outputting light reception signals corresponding to lights having the wavelengths of the first and second illumination lights and is configured to be incapable of outputting a light reception signal corresponding to light having the wavelength of the measurement light. Consequently, in this embodiment, a light spot of the measurement light does not appear in the image acquired by the imaging section 220.

(3) The Reference Section

Figure 4:
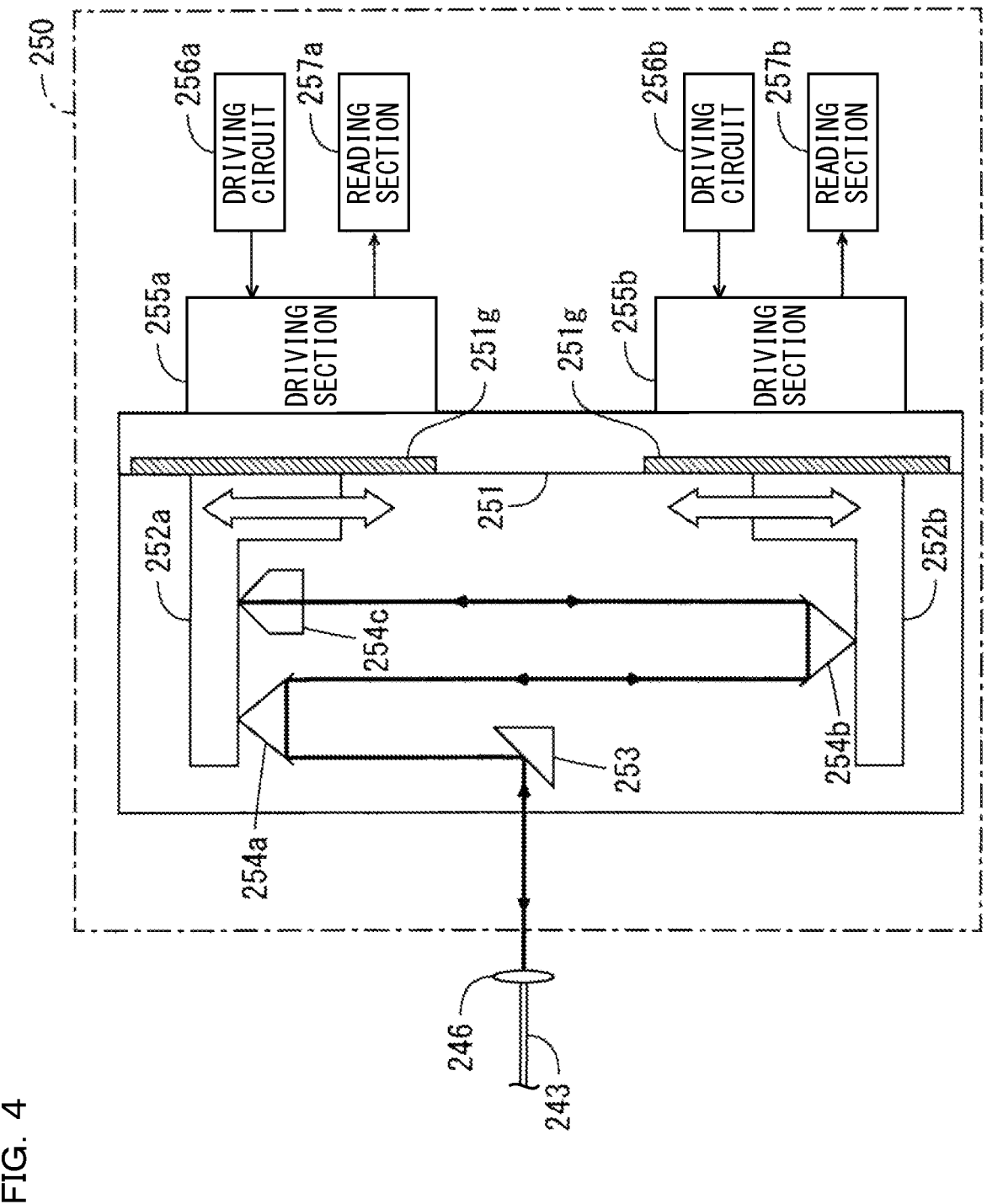
FIG. 4 is a schematic diagram showing the configuration of a reference section.

FIG. 4 is a schematic diagram showing the configuration of the reference section 250. As shown in FIG. 4, the reference section 250 includes a supporting section 251, movable sections 252a and 252b, reflecting members 253, 254a, 254b, and 254c, driving sections 255a and 255b, driving circuits 256a and 256b, and reading sections 257a and 257b.

The supporting section 251 is fixed to a main body of the measurement head 200. Linearly extending two linear guides 251g are attached to the supporting section 251. The two linear guides 251g are fixed to the supporting section 251 such that both of the linear guides 251g extend in one direction and are arranged side by side in one direction. More specifically, the two linear guides 251g are fixed to the supporting section 251 such that the two linear guides 251g are parallel to each other and one linear guide 251g is located on an extended line of the other linear guide 251g. The movable section 252a and 252b are respectively attached to the two linear guides 251g and supported by the supporting section 251 to be capable of moving on the linear guides 251g corresponding to the movable sections 252a and 252b along a direction in which the linear guides 251g extend.

The reflecting member 253 is attached to the supporting section 251 and fixed. The reflecting members 254a and 254c are attached to the movable section 252a. The reflecting member 254b is attached to the movable section 252b. The reflecting member 254c is used as a reference body. In this embodiment, the reflecting member 254c is configured by a corner cube reflector. The corner cube reflector reflects light in an original direction irrespective of an incident direction. Therefore, it is possible to accurately and easily set an optical path of the reference light in the reference section 250. Note that the reflecting member 254c is not limited to the corner cube reflector. A reflection prism or the like may be used.

The reference light output from the optical fiber 243 is substantially collimated by passing through the lens 246 and thereafter sequentially reflected by the reflecting member 253, the reflecting member 254a, the reflecting member 254b, and the reflecting member 254c. The reference light reflected by the reflecting member 254c is sequentially reflected by the reflecting member 254b, the reflecting member 254a, and the reflecting member 253 and input to the optical fiber 243 through the lens 246.

The driving sections 255a and 255b are, for example, voice coil motors. As indicated by white arrows in FIG. 4, the driving sections 255a and 255b respectively move, with respect to the supporting section 251, the movable sections 252a and 252b in the direction in which the linear guides 251g extend. In this case, in a direction parallel to the moving direction of the movable sections 252a and 252b, the distance between the reflecting member 253 and the reflecting member 254a, the distance between the reflecting member 254a and the reflecting member 254b, and the distance between the reflecting member 254b and the reflecting member 254c change. Consequently, it is possible to adjust an optical path length of the reference light. Note that the driving sections 255a and 255b may be configured by other driving mechanisms such as stepping motors or piezoelectric motors instead of the voice coil motors.

The optical path length of the reference light is the length of an optical path from the time when the reference light is output from the port 245c shown in FIG. 2 until the reference light reflected by the reflecting member 254c is input to the port 245d. When a difference between the optical path length of the reference light and the optical path length of the measurement light is equal to or smaller than a fixed value, interference light of the reference light and the measurement light is output from the port 245b shown in FIG. 2.

The driving circuits 256a and 256b are connected to the control board 210 shown in FIG. 2. The driving circuits 256a and 256b respectively operate the driving sections 255a and 255b on the basis of the control by the control board 210. At this point, the driving circuits 256a and 256b move the movable sections 252a and 252b with respect to the supporting section 251 in opposite directions each other. In this case, even if the movable sections 252a and 252b intermittently repeat movement and stop, the position of the center of gravity of the three-dimensional measuring device 400 hardly changes. Consequently, the position of the center of gravity of the three-dimensional measuring device 400 is stabilized during the movement of the movable sections 252a and 252b.

The reading sections 257a and 257b are, for example, optical linear encoders. The reading section 257a reads a driving amount of the driving section 255a to thereby detect a relative position of the movable section 252a with respect to the supporting section 251 and gives a result of the detection to the control board 210. The reading section 257b reads a driving amount of the driving section 255b to thereby detect a relative position of the movable section 252b with respect to the supporting section 251 and gives a result of the detection to the control board 210.

In the reference section 250 explained above, a total of the weight of one movable section 252a and the weight of the reflecting members 254a and 254c attached to the movable section 252a is desirably set to be in an equal or substantially equal range from a total of the weight of the other movable section 252b and the weight of the reflecting member 254b attached to the movable section 252b.

In this embodiment, the movable sections 252a and 252b move in opposite directions each other along the direction in which the linear guides 251g extend. However, the present invention is not limited to this. Only one of the movable section 252a and the movable section 252b may move along the direction in which the linear guide 251g extends and the other may not move. In this case, the unmoving other movable section 252a or 252b may be fixed to the fixed section 251 or the main body of the measurement head 200 rather than the linear guides 251g as an unmovable section.

(4) The Focusing Section

Figure 5:
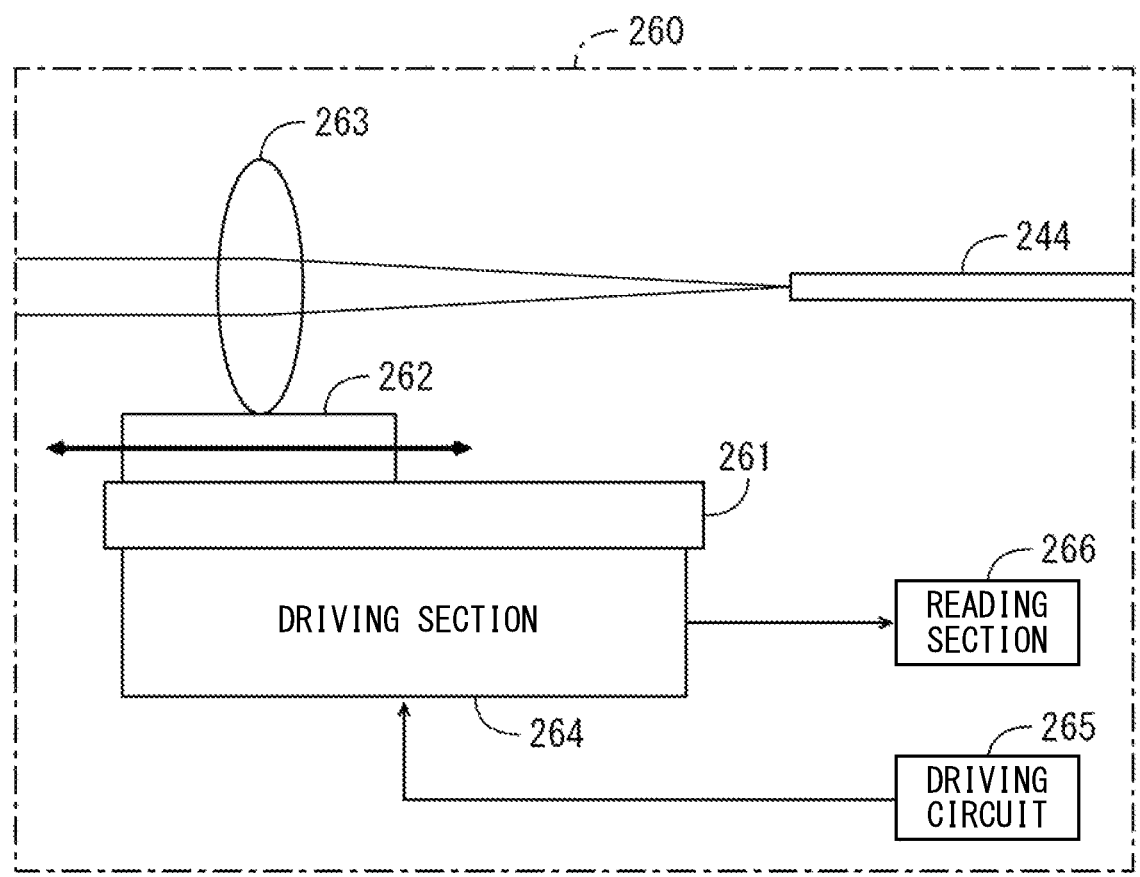
FIG. 5 is a schematic diagram showing the configuration of a focusing section.

FIG. 5 is a schematic diagram showing the configuration of the focusing section 260. As shown in FIG. 5, the focusing section 260 includes a fixed section 261, a movable section 262, a movable lens 263, a driving section 264, a driving circuit 265, and a reading section 266. The movable section 262 is attached to the fixed section 261 to be capable of moving along one direction. The movable lens 263 is attached to the movable section 262. The movable lens 263 focuses measurement light that passes through the movable lens 263.

The measurement light output from the optical fiber 244 is guided to the deflecting section 270 shown in FIG. 2 through the movable lens 263. Apart of the measurement light reflected by the measurement object S shown in FIG. 2 passes through the deflecting section 270 and thereafter is input to the optical fiber 244 through the movable lens 263.

The driving section 264 is, for example, a voice coil motor. As indicated by a thick arrow in FIG. 5, the driving section 264 moves the movable section 262 in one direction (a traveling direction of the measurement light) with respect to the fixed section 261. Consequently, it is possible to locate a focus of the measurement light on the surface of the measurement object S.

The driving circuit 265 is connected to the control board 210 shown in FIG. 2. The driving circuit 265 operates the driving section 264 on the basis of the control by the control board 210. The reading section 266 is, for example, an optical linear encoder. The reading section 266 reads a driving amount of the driving section 264 to thereby detect a relative position of the movable section 262 (the movable lens 263) with respect to the fixed section 261. The reading section 266 gives a result of the detection to the control board 210.

The control board 210 controls the driving circuit 265 on the basis of the detection result of the reading section 266 and distance information calculated by a distance-information calculating section 12 (FIG. 9) explained below to focus the measurement light on the surface of the measurement object S. In this way, the measurement light is focused on the surface of the measurement object. Consequently, measurement accuracy of the three-dimensional measuring device 400 is improved.

Note that a collimator lens that collimates the measurement light output from the optical fiber 244 may be disposed between the optical fiber 244 and the movable lens 263. In this case, the measurement light made incident on the movable lens 263 is collimated. A beam diameter of the measurement light does not change irrespective of a moving position of the movable lens 263. Therefore, it is possible to form the movable lens 263 small.

(5) The Deflecting Section

Figure 6:
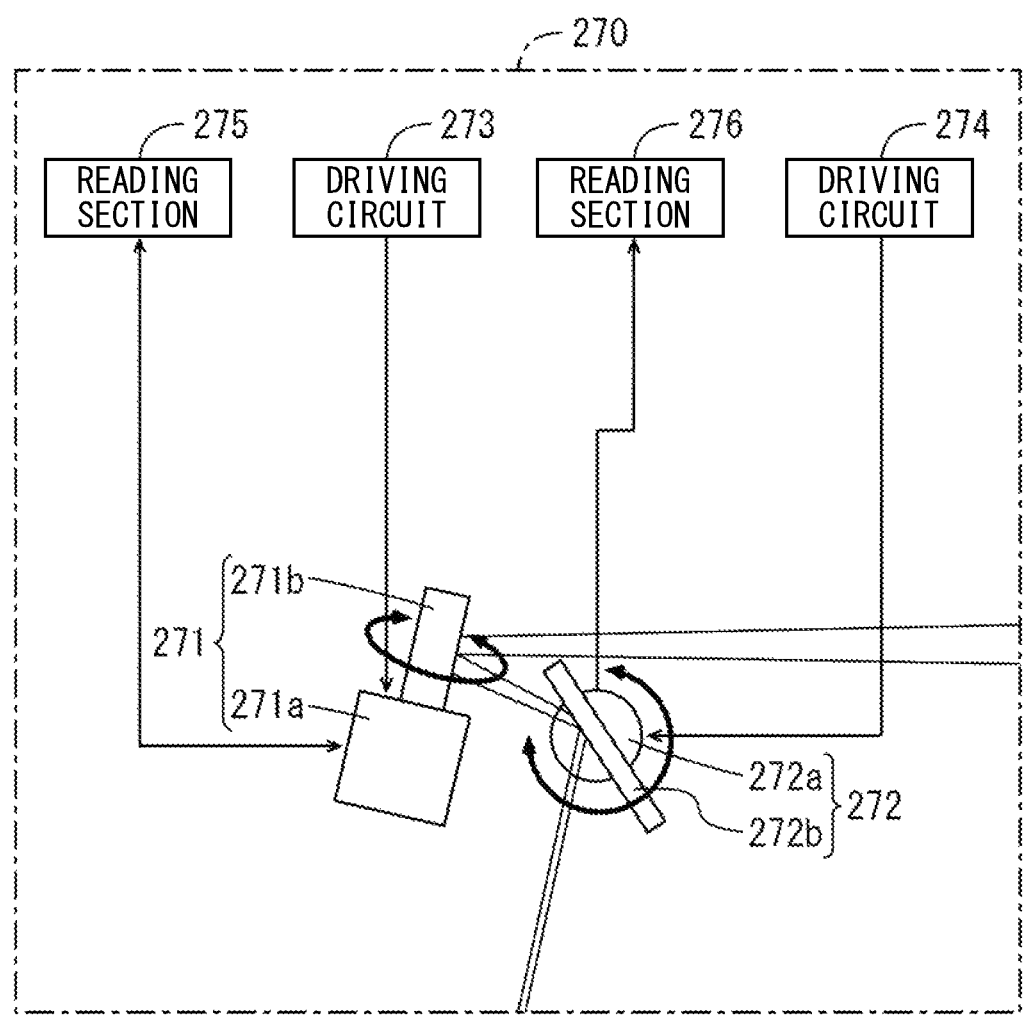
FIG. 6 is a schematic diagram showing the configuration of a deflecting section.

FIG. 6 is a schematic diagram showing the configuration of the deflecting section 270. As shown in FIG. 6, the deflecting section 270 includes reflecting sections 271 and 272, driving circuits 273 and 274, and reading sections 275 and 276. The reflecting section 271 is configured by, for example, a galvanometer mirror and includes a driving section 271a and a reflecting member 271b. The driving section 271a is, for example, a motor having a rotating shaft in a substantially perpendicular direction. The reflecting member 271b is attached to the rotating shaft of the driving section 271a. The measurement light passed through the optical fiber 244 to the focusing section 260 shown in FIG. 2 is guided to the reflecting member 271b. The driving section 271a rotates, whereby a reflection angle of the measurement light reflected by the reflecting member 271b changes in a substantially horizontal plane.

Like the reflecting section 271, the reflecting section 272 is configured by, for example, a galvanometer mirror and includes a driving section 272a and a reflecting member 272b. The driving section 272a is, for example, a motor including a rotating shaft in the horizontal direction. The reflecting member 272b is attached to the rotating shaft of the driving section 272a. The measurement light reflected by the reflecting member 271b is guided to the reflecting member 272b. The driving section 272a rotates, whereby a reflection angle of the measurement light reflected by the reflecting member 272b changes in a substantially horizontal plane.

In this way, the driving sections 271a and 272a rotate, whereby the measurement light is scanned in two directions orthogonal to each other on the collimate lens 283 of the second light guide section 280 shown in FIG. 2. As explained above, the collimate lens 283 converts the traveling direction of the measurement light emitted from the deflecting section 270 into the direction parallel to the optical axis of the telecentric optical system 281 and guides the measurement light to the telecentric optical system 281 through the half mirror 282.

Consequently, the measurement light passing through the telecentric optical system 281 is scanned in two directions orthogonal to each other on the surface of the measurement object S shown in FIG. 2. In the way, it is possible to irradiate the measurement light on any position on the surface of the measurement object S. The measurement light irradiated on the measurement object S is reflected on the surface of the measurement object S. Apart of the reflected measurement light is sequentially reflected by the reflecting member 272b and the reflecting member 271b through the second light guide section 280 shown in FIG. 2 and thereafter guided to the focusing section 260 shown in FIG. 2.

The driving circuits 273 and 274 are connected to the control board 210 shown in FIG. 2. The driving circuits 273 and 274 respectively drive the driving sections 271a and 272a on the basis of the control by the control board 210. The reading sections 275 and 276 are, for example, an optical rotary encoder. The reading section 275 reads a driving amount of the driving section 271a to thereby detect an angle of the reflecting member 271b and gives a result of the detection to the control board 210. The reading section 276 reads a driving amount of the driving section 272a to thereby detect an angle of the reflecting member 272b and gives a result of the detection to the control board 210.

(6) Operation Modes

Figure 7:
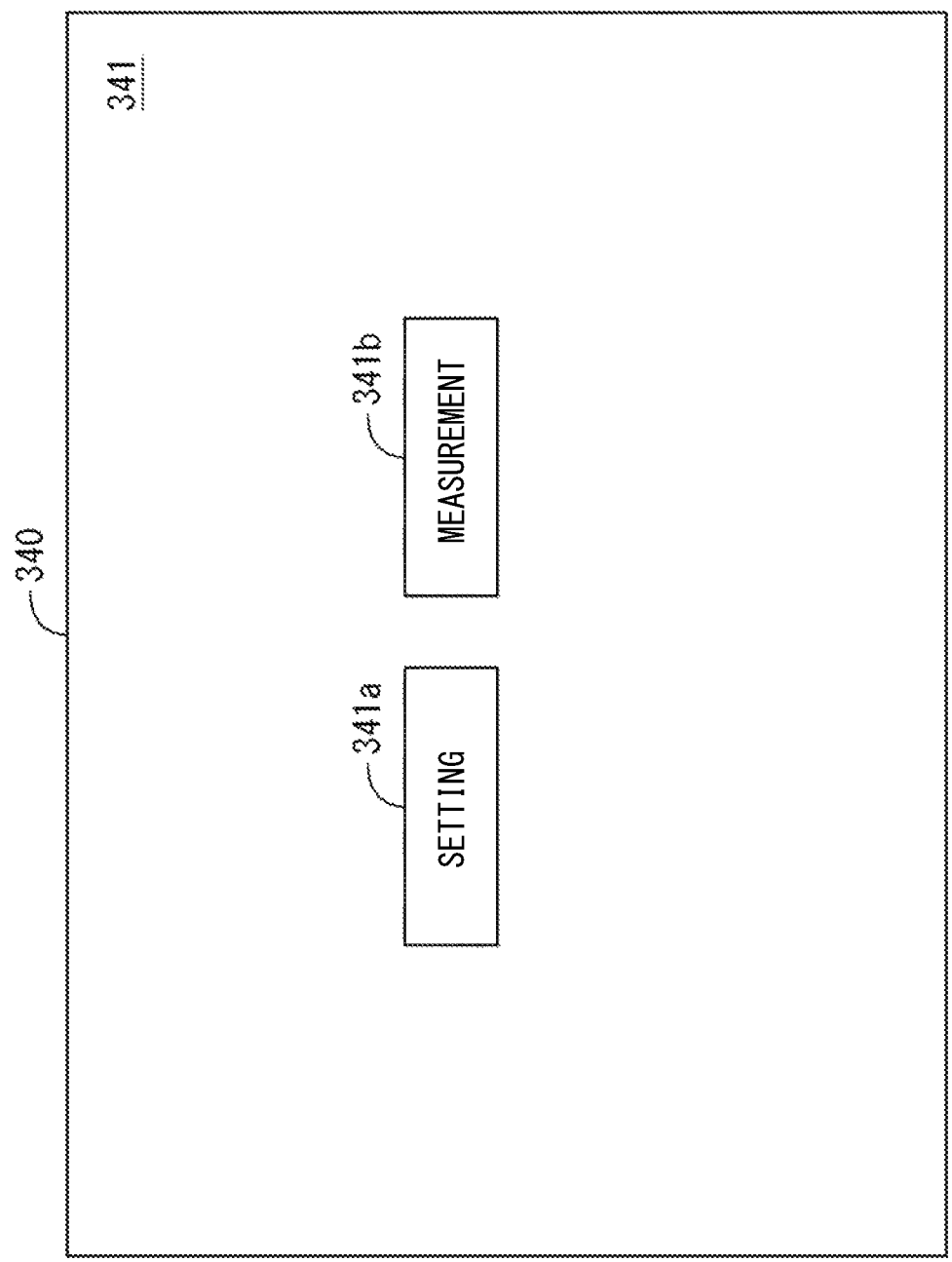
FIG. 7 is a diagram showing an example of a selection screen displayed on a display section of the three-dimensional measuring device.

The three-dimensional measuring device 400 operates in an operation mode selected from a plurality of operation modes by the user. Specifically, the operation modes include a setting mode and a measurement mode. FIG. 7 is a diagram showing an example of a selection screen 341 displayed on the display section 340 of the three-dimensional measuring device 400.

As shown in FIG. 7, a setting button 341a and a measurement button 341b are displayed on the selection screen 341 of the display section 340. The user operates the setting button 341a and the measurement button 341b using the operation section 330 shown in FIG. 1, whereby the three-dimensional measuring device 400 operates respectively in the setting mode and the measurement mode.

In the following explanation, among users, a skilled user who manages measurement work of the measurement object S is referred to as measurement manager as well and a user who performs the measurement work of the measurement object S under the management of the measurement manger is referred to as measurement operator as appropriate. The setting mode is mainly used by the measurement manager. The measurement mode is mainly used by the measurement operator.

In the three-dimensional measuring device 400 according to this embodiment, a three-dimensional coordinate system peculiar to a space including the measurement region V shown in FIG. 2 (hereinafter referred to as peculiar three-dimensional coordinate system) is defined by an X axis, a Y axis, and a Z axis in advance. The X axis and the Y axis are parallel to the placement plate 111 shown in FIG. 2 and orthogonal to each other. The Z axis is orthogonal to the X axis and the Y axis. In the operation modes, when the height of a part on the surface of the measurement object S is measured, data of a coordinate specified by the coordinate system and data of a plane coordinate on an image acquired by the imaging of the imaging section 220 are transmitted between the control section 310 and the control board 210.

FIGS. 8A to 8C are diagrams showing contents of data transmitted between the control section 310 and the control board 210 in order to measure the height of the surface of the measurement object Sin the operation modes. In the setting mode, the measurement manager can register information concerning a desired measurement object S in the three-dimensional measuring device 400. Specifically, the measurement manager places the desired measurement object S on the placement plate 111 shown in FIG. 2 and images the measurement object S with the imaging section 220 shown in FIG. 2. Therefore, the measurement manager designates, on the image, as a height measurement point, a portion where the height of the measurement object S displayed on the display section 340 shown in FIG. 1 should be measured. In this case, as shown in FIG. 8A, the control section 310 gives a plane coordinate (Ua, Va) specified by the designated height measurement point on the image to the control board 210.

When the height measurement point is designated, the control board 210 specifies a three-dimensional coordinate (Xc, Yc, Zc) of a position corresponding to the plane coordinate (Ua, Va) in the measurement region V shown in FIG. 2 and gives the specified three-dimensional coordinate (Xc, Yc, Zc) to the control section 310. The control section 310 causes the storing section 320 shown in FIG. 1 to store the three-dimensional coordinate (Xc, Yc, Zc) given by the control board 210. The control section 310 calculates height of a portion corresponding to the height measurement point on the basis of the three-dimensional coordinate (Xc, Yc, Zc) stored in the storing section 320 and information concerning a reference plane and the like explained below and causes the storing section 320 to store (register) a result of the calculation.

In the setting mode, the measurement manager can also designate, as explained below, on an image of the measurement object S, as a dimension measurement portion, a portion where a dimension in a direction orthogonal to the height direction of the measurement object S (the Z-axis direction) should be measured. In this case, information representing the designated dimension measurement portion on the image is stored (registered) in the storing section 320 together with the three-dimensional coordinate (Xc, Yc, Zc) of the height measurement point.

The measurement mode is used in order to measure the height of the portion corresponding to the height measurement point and in order to measure the dimension of the portion corresponding to the dimension measurement portion concerning the measurement object S of the same type as the measurement object S, information of which is registered in the three-dimensional measuring device 400 in the setting mode. Specifically, the measurement operator places, on the placement plate 111, the measurement object S of the same type as the measurement object S, the information of which is registered in the three-dimensional measuring device 400 in the setting mode, and images the measurement object S with the imaging section 220. In this case, as shown in FIG. 8B, the control section 310 gives the three-dimensional coordinate (Xc, Yc, Zc) stored in the storing section 320 in the setting mode to the control board 210.

The control board 210 calculates, on the basis of the acquired three-dimensional coordinate (Xc, Yc, Zc), a three-dimensional coordinate (Xb, Yb, Zb) of a portion of the measurement object S corresponding to the height measurement point. At this point, the three-dimensional coordinate (Xc, Yc, Zc) corresponding to the height measurement point designated in the setting mode is stored in the storing section 320. Therefore, in the measurement mode, it is possible to quickly specify a portion corresponding to the height measurement point and calculate the three-dimensional coordinate (Xb, Yb, Zb) in a short time on the basis of the stored three-dimensional coordinate (Xc, Yc, Zc). The control board 210 gives the calculated three-dimensional coordinate (Xb, Yb, Zb) to the control section 310. The control section 310 calculates height of the portion corresponding to the height measurement point on the basis of the three-dimensional coordinate (Xb, Yb, Zb) given by the control board 210 and information concerning a reference plane and the like explained below. The control section 310 causes the display section 340 shown in FIG. 1 to display a result of the calculation.

Further, when the dimension measurement portion of the measurement object S is registered in the setting mode, the control section 310 calculates, on the basis of an image of the measurement object S obtained by the imaging of the imaging section 220, the dimension of a portion corresponding to the registered dimension measurement portion. In this case, the control section 310 causes the display section 340 shown in FIG. 1 to display a result of the calculation.

In this way, in the measurement mode, the measurement operator can acquire, without designating a portion where the height of the measurement object S should be measured, the height of the portion. The measurement operator can acquire, without designating a portion where the dimension of the measurement object S should be measured, the dimension of the portion. Therefore, even when the measurement operator is not skilled, it is possible to easily and accurately measure a shape of a desired portion of the measurement object.

As explained above, in this embodiment, the three-dimensional coordinate (Xc, Yc, Zc) corresponding to the plane coordinate (Ua, Va) is specified in the setting mode and stored in the storing section 320. However, the present invention is not limited to this. In the setting mode, a plane coordinate (Xc, Yc) corresponding to the plane coordinate (Ua, Va) may be specified and a component Zc of the Z axis may be not specified. In this case, the specified plane coordinate (Xc, Yc) is stored in the storing section 320. In the measurement mode, the plane coordinate (Xc, Yc) stored in the storing section 320 is given to the control board 210.

In the storing section 320 shown in FIG. 1, coordinate conversion information and position conversion information are stored in advance. The coordinate conversion information indicates a plane coordinate (Xc, Yc) of the peculiar three-dimensional coordinate system corresponding to a plane coordinate (Ua, Va) acquired by the imaging section 220. The control board 210 can irradiate the measurement light parallel to the optical system of the telecentric optical system 281 (the measurement light parallel to the Z axis) on a desired position in the measurement region V by controlling angles of the reflecting members 271b and 272b shown in FIG. 6. The position conversion information indicates a relation between the plane coordinate in the measurement region V and the angles of the reflecting members 271b and 272b.

A control system configured by the control section 310 and the control board 210 can specify a three-dimensional coordinate (Xc, Yc, Zc) and a three-dimensional coordinate (Xb, Yb, Zb) of a position corresponding to the height measurement point by adjusting the positions of the movable sections 252a and 252b shown in FIG. 4 while irradiating the measurement light on the measurement region V using the coordinate conversion information and the position conversion information.

Figure 9:
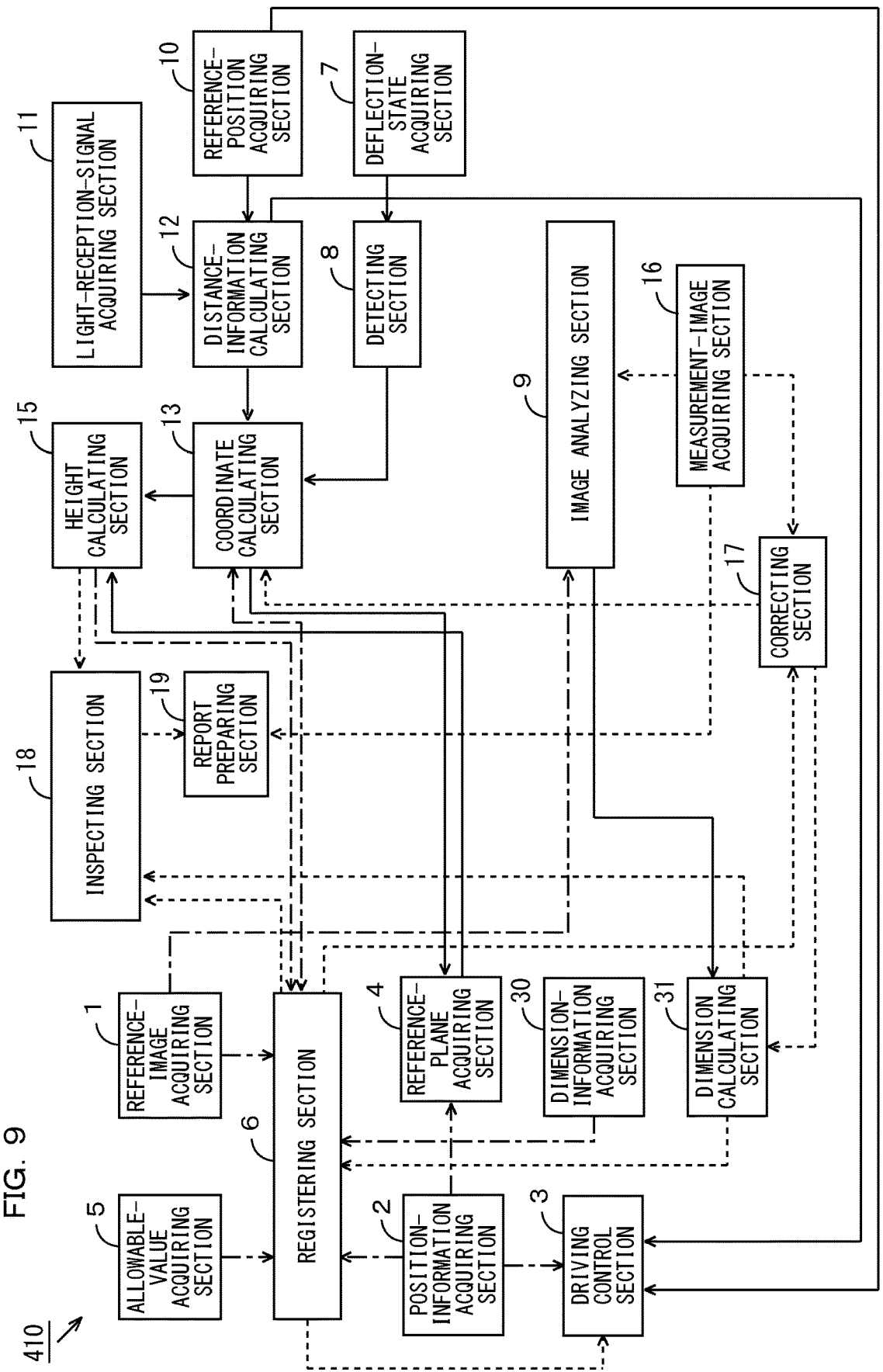
FIG. 9 is a block diagram showing a control system of the three-dimensional measuring device shown in FIG. 1.
Figure 10:
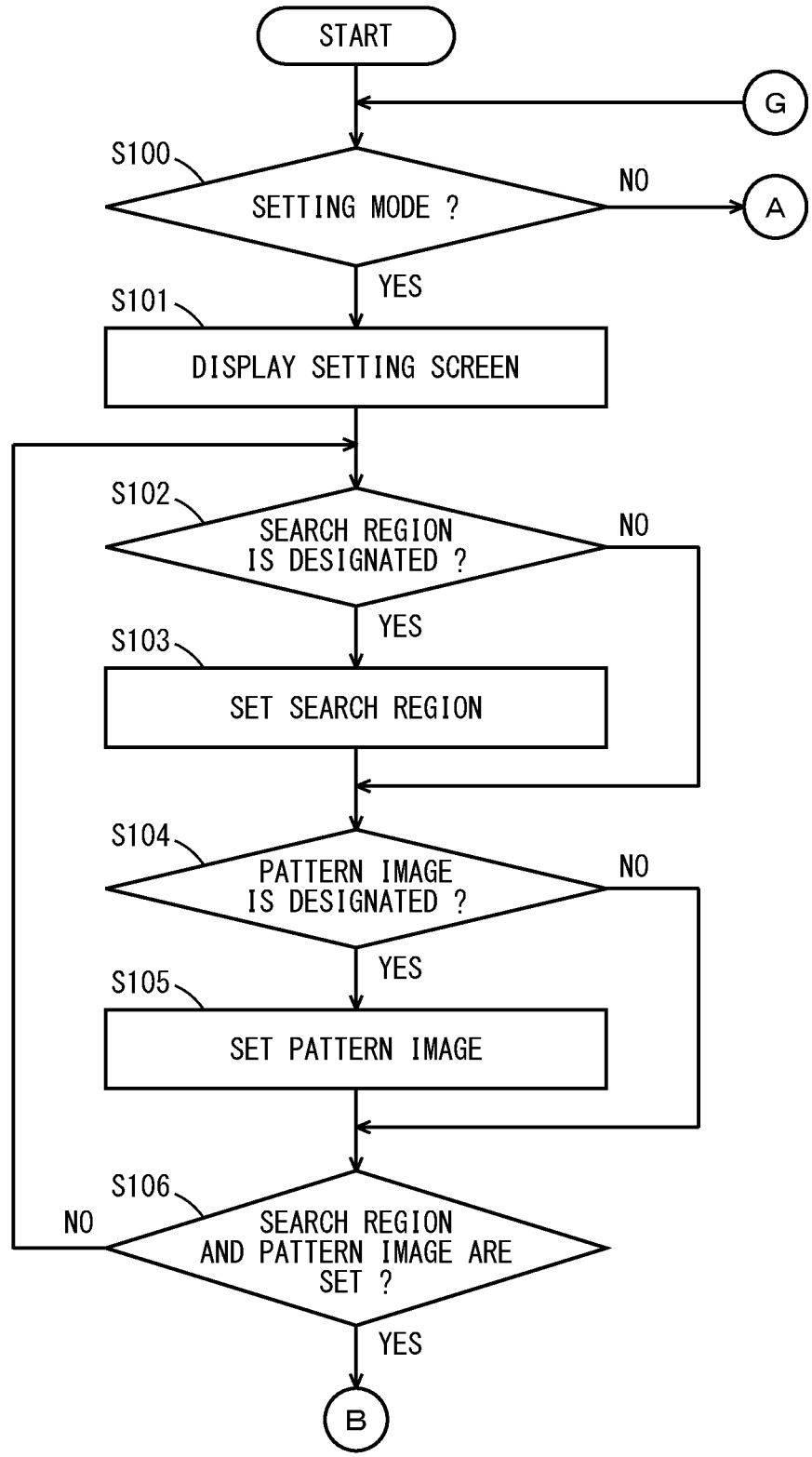
FIG. 10 is a flowchart for explaining an example of three-dimensional measurement processing executed in the three-dimensional measuring device shown in FIG. 1.
Figure 11:
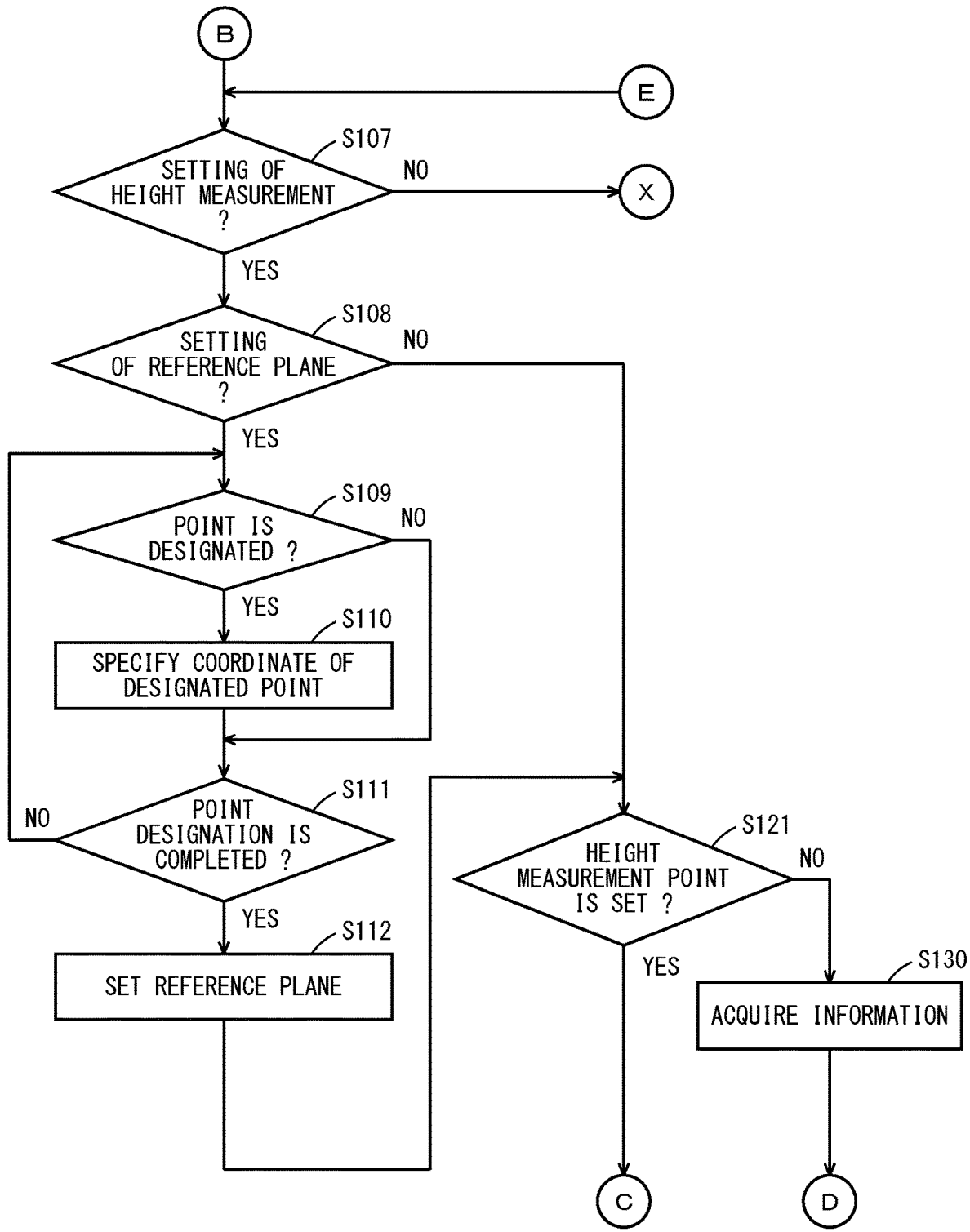
FIG. 11 is a flowchart showing the example of the three-dimensional measurement processing executed in the three-dimensional measuring device shown in FIG. 1.
Figure 12:
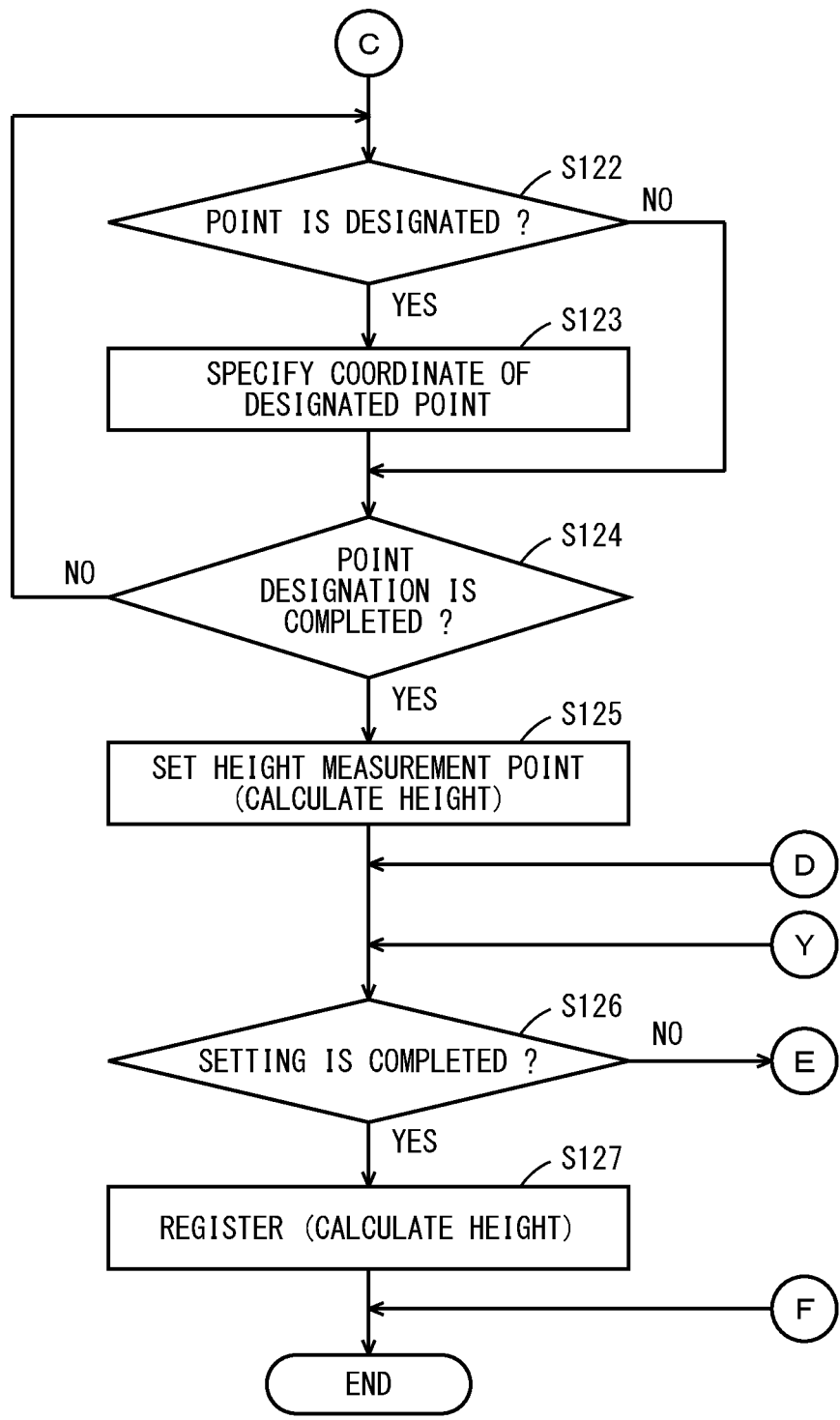
FIG. 12 is a flowchart showing the example of the three-dimensional measurement processing executed in the three-dimensional measuring device shown in FIG. 1.

(7) A Control System of the Three-Dimensional Measuring Device (a) Overall Configuration of the Control System FIG. 9 is a block diagram showing the control system of the three-dimensional measuring device 400 shown in FIG. 1. As shown in FIG. 9, a control system 410 includes a reference-image acquiring section 1, a position-information acquiring section 2, a driving control section 3, a reference-plane acquiring section 4, an allowable-value acquiring section 5, a registering section 6, a deflection-state acquiring section 7, a detecting section 8, and an image analyzing section 9. The control system 410 further includes a reference-position acquiring section 10, a light-reception-signal acquiring section 11, a distance-information calculating section 12, a coordinate calculating section 13, a height calculating section 15, a measurement-image acquiring section 16, a correcting section 17, an inspecting section 18, a report preparing section 19, a dimension-information acquiring section 30, and a dimension calculating section 31.

The control board 210 and the control section 310 shown in FIG. 1 execute the system program stored in the storing section 320, whereby functions of the components of the control system 410 are realized. In FIG. 9, a flow of common processing in the two operation modes is indicated by solid lines, a flow of processing in the setting mode is indicated by alternate long and short dash lines, and a flow of processing in the measurement mode is indicated by dotted lines. The same applies in FIG. 28 referred to below. In the following explanation, to facilitate understanding, the components of the control system 410 in the setting mode and the measurement mode are separately explained.

(b) The Setting Mode

The measurement manager places a desired measurement object S on the placement plate 111 shown in FIG. 2 and images the measurement object S with the imaging section 220 shown in FIG. 2. The reference-image acquiring section 1 acquires, as reference image data, image data generated by the imaging section 220 and causes the display section 340 shown in FIG. 1 to display, as a reference image, an image based on the acquired reference image data. The reference image displayed on the display section 340 may be a still image or may be a moving image that is sequentially updated. The measurement manager can designate, on the reference image displayed on the display section 340, as a height measurement point, a portion where height should be measured and designate a reference point. The reference point is a point for deciding a reference plane serving as a reference in calculating height of the measurement object S. The measurement manager can designate, on the reference image displayed on the display section 340, as a dimension measurement portion, a portion where a dimension in a direction orthogonal to the height direction of the measurement object S (the Z-axis direction) should be measured.

The position-information acquiring section 2 receives designation of the height measurement point on the reference image acquired by the reference-image acquiring section 1 and acquires a position (the plane coordinate (Ua, Va) explained above) of the received height measurement point. The position-information acquiring section 2 receives designation of a reference point using the reference image and acquires a position of the received reference point. The position-information acquiring section 2 is also capable of receiving a plurality of height measurement points and is also capable of receiving a plurality of reference points.

The dimension-information acquiring section 30 receives the designation of the dimension measurement portion on the reference image acquired by the reference-image acquiring section 1.

The driving control section 3 acquires the position of the measurement head 200 from the reading section 133 of the lift 130 shown in FIG. 2 and controls the driving circuit 132 shown in FIG. 2 on the basis of the acquired position of the measurement head 200. Consequently, the measurement head 200 is moved to a desired position in the up-down direction. The driving control section 3 acquires the position of the movable lens 263 from the reading section 266 of the focusing section 260 shown in FIG. 5 and controls the driving circuit 265 shown in FIG. 5 on the basis of the acquired position of the movable lens 263 and a distance calculated by the distance-information calculating section 12 explained below. Consequently, the movable lens 263 is moved such that the measurement light is focused near the surface of the measurement object S.

The driving control section 3 controls the driving circuits 273 and 274 shown in FIG. 6 on the basis of the position conversion information stored in the storing section 320 shown in FIG. 1 and the position acquired by the position-information acquiring section 2. Consequently, the angles of the reflecting members 271b and 272b of the reflecting sections 271 and 272 shown in FIG. 6 are adjusted. The measurement light is irradiated on portions of the measurement object S corresponding to the height measurement point and the reference point.

At this point, the driving control section 3 controls the driving circuits 256a and 256b shown in FIG. 4 to thereby adjust the optical path length of the reference light according to a change in the optical path length of the measurement light such that a difference between the optical path length of the measurement light and the optical path length of the reference light is equal to or smaller than a fixed value. More specifically, in the driving control section 3, a threshold concerning the difference between the optical path length of the measurement light and the optical path length of the reference light is set in advance such that appropriate interference light is obtained. Therefore, when the difference between the optical path length of the measurement light and the optical path length of the reference light calculated by the distance-information calculating section 12 explained below is equal to or smaller than the threshold, the driving control section 3 controls the driving circuits 256a and 256b shown in FIG. 4 such that the optical path length of the reference light is maintained. On the other hand, when the difference between the optical path length of the measurement light and the optical path length of the reference light is larger than the threshold, the driving control section 3 controls the driving circuits 256a and 256b shown in FIG. 4 such that the optical path length of the reference light changes. Consequently, it is possible to easily adjust the optical path length of the reference light to an appropriate size.

According to the operation of the driving control section 3 explained above, coordinates of the portions of the measurement object S corresponding to the height measurement point and the reference point are calculated by the coordinate calculating section 13 as explained below. In the following explanation, processing for calculating a coordinate of the portion of the measurement object S corresponding to the height measurement point is explained. However, processing for calculating a coordinate of the portion of the measurement object S corresponding to the reference point is the same as the processing for calculating a coordinate of the portion of the measurement object S corresponding to the height measurement point.

The reference-plane acquiring section 4 acquires a reference plane on the basis of one or a plurality of coordinates calculated by the coordinate calculating section 13 according to one or a plurality of reference points acquired by the position-information acquiring section 2. Concerning the height measurement point acquired by the position-information acquiring section 2, the measurement manager can input an allowable value for height. Concerning the dimension measurement portion acquired by the dimension-information acquiring section 30, the measurement manger can input an allowable value for a dimension. The allowable value is used for inspection of the measurement object S in the measurement mode explained below and includes a design value and a tolerance from the design value. The allowable-value acquiring section 5 acquires the input allowable values.

The registering section 6 registers the reference image data acquired by the reference-image acquiring section 1, the position acquired by the position-information acquiring section 2, the dimension measurement portion acquired by the dimension-information acquiring section 30, and the allowable values acquired by the allowable-value acquiring section 5 in association with one another. Specifically, the registering section 6 causes the storing section 320 to store registration information indicating a relation among the reference image data, the positions of the height measurement point and the reference point, the position of the dimension measurement portion, and the allowable values corresponding to the measurement values. A plurality of reference planes may be set. In this case, the registering section 6 registers, for each reference plane, a reference point corresponding to the reference plane, a height measurement point corresponding to the reference plane, and allowable values corresponding to measurement values in association with one another.

A deflection-state acquiring section 7 acquires angles of the reflecting members 271b and 272b respectively from the reading sections 275 and 276 shown in FIG. 6. The detecting section 8 detects deflecting directions of the measurement light by the reflecting members 271b and 272b on the basis of the angles of the reflecting members 271b and 272b acquired by the deflection-state acquiring section 7. The image analyzing section 9 analyzes the reference image data acquired by the reference-image acquiring section 1.

The reference-position acquiring section 10 acquires positions of the movable sections 252a and 252b respectively from the reading sections 257a and 257b of the reference section 250 shown in FIG. 4. The light-reception-signal acquiring section 11 acquires a light reception signal from the light receiving section 232d shown in FIG. 3.

The distance-information calculating section 12 performs, on the basis of the light reception signal acquired by the light receiving section 232d, a predetermined arithmetic operation and predetermined processing on data indicating a relation between a wavelength and a received light amount of interference light. The arithmetic operation and the processing include, for example, a frequency axis conversion from a wavelength to a wave number and Fourier transform of the wave number. The distance-information calculating section 12 calculates, a difference between the optical path length of the measurement light and the optical path length of the reference light on the basis of the data obtained by the processing and the positions of the movable sections 252a and 252b acquired by the reference-position acquiring section 10. Further, the distance-information calculating section 12 calculates, on the basis of the calculated difference, distance information indicating the distance between an emission position of the measurement light in the measurement head 200 shown in FIG. 2 and an irradiation position of the measurement light in the measurement object S. The emission position of the measurement light in the measurement head 200 is, for example, the position of the port 245d of the light guide section 240 shown in FIG. 2.

The coordinate calculating section 13 calculates a three-dimensional coordinate (Xc, Yc, Zc) of the irradiation position of the measurement light on the measurement object S on the basis of the deflecting directions of the measurement light by the reflecting member 271b and 271b detected by the detecting section 8 and the distance information calculated by the distance-information calculating section 12.

The coordinate calculating section 13 gives the coordinate calculated concerning the reference point to the reference-plane acquiring section 4. The height calculating section 15 calculates, on the basis of the three-dimensional coordinate (Xc, Yc, Zc) calculated by the coordinate calculating section 13 according to the height measurement point, height of a portion of the measurement object S based on the reference plane acquired by the reference-plane acquiring section 4. For example, when the reference plane is a plane, the height calculating section 15 calculates, as height, length from the reference plane to three-dimensional coordinate (Xc, Yc, Zc) in the perpendicular of the reference plane passing the three-dimensional coordinate (Xc, Yc, Zc). The height calculating section 15 causes the display section 340 to display the calculated height. The dimension calculating section 31 calculates, on the basis of an analysis result of the reference image data by the image analyzing section 9, a dimension of a portion of the measurement object S corresponding to the dimension measurement portion registered by the registering section 6. The dimension calculating section 31 causes the display section 340 to display the calculated dimension. The registering section 6 registers, as further registration information, the three-dimensional coordinate (Xc, Yc, Zc) calculated by the coordinate calculating section 13, the height calculated by the height calculating section 15, and the dimension calculated by the dimension calculating section 31 in association with the reference image data, the position of the height measurement point, the dimension measurement portion, the position of the reference point, and the allowable values registered earlier.

Note that, in the setting mode, as explained above, the component Zc of the Z axis corresponding to the designated height measurement point may be not specified. In this case, the height calculating section 15 may not calculate height of the portion of the measurement object S corresponding to the designated height measurement point. In the setting mode, the dimension calculating section 31 may not calculate a dimension of the portion of the measurement object S corresponding to the designated dimension measurement portion.

(c) The Measurement Mode

The measurement operator places, on the placement plate 111 shown in FIG. 2, the measurement object S of the same type as the measurement object S, the registration information of which is registered in the setting mode, and images the measurement object S with the imaging section 220 shown in FIG. 2. The measurement-image acquiring section 16 acquires, as measurement image data, image data generated by the imaging section 220 and causes the display section 340 shown in FIG. 1 to display, as a measurement image, an image based on the acquired measurement image data.

The correcting section 17 corrects deviation of the measurement image data with respect to the reference image data on the basis of the registration information registered by the registering section 6. Consequently, the correcting section 17 sets, in the measurement image data, the height measurement point, the reference point, and the dimension measurement portion corresponding to the registration information registered by the registering section 6.

The driving control section 3 controls the driving circuits 273 and 274 shown in FIG. 6 and the driving circuits 256a and 256b shown in FIG. 4 on the basis of the registration information registered by the registering section 6 in the setting mode. Consequently, three-dimensional coordinates of the portions of the measurement object S corresponding to the height measurement point and the reference point set by the correcting section 17 are calculated by the coordinate calculating section 13. The driving control section 3 performs the control on the basis of the three-dimensional coordinate and the height registered in the setting mode. Therefore, the coordinate calculating section 13 can efficiently calculate the three-dimensional coordinates of the portions of the measurement object S corresponding to the height measurement point and the reference point set by the correcting section 17.

The kinds of processing by the deflection-state acquiring section 7 and the detecting section 8 in the measurement mode are respectively the same as the kinds of processing by the deflection-state acquiring section 7 and the detecting section 8 in the setting mode. The processing by the image analyzing section 9 in the measurement mode is the same as the processing by the image analyzing section 9 in the setting mode except that the measurement image data acquired by the measurement-image acquiring section 16 is used instead of the reference image data acquired by the reference-image acquiring section 1. The kinds of processing by the reference-position acquiring section 10, the light-reception-signal acquiring section 11, and the distance-information calculating section 12 in the measurement mode are respectively the same as the kinds of processing by the reference-position acquiring section 10, the light-reception-signal acquiring section 11, and the distance-information calculating section 12 in the setting mode.

The coordinate calculating section 13 calculates a three-dimensional coordinate $(Xb, Yb, Zb)$ of the irradiation position of the measurement light on the measurement object S on the basis of the deflecting directions of the measurement light by the reflecting members 271b and 272b detected by the detecting section 8 and the distance information calculated by the distance-information calculating section 12.

The reference-plane acquiring section 4 acquires a reference plane on the basis of a coordinate corresponding to the reference point calculated by the coordinate calculating section 13. The height-calculating section 15 calculates, on the basis of the three-dimensional coordinate $(Xb, Yb, Zb)$ calculated by the coordinate calculating section 13, height of a portion of the measurement object S based on the reference plane acquired by the reference-plane acquiring section 4. The height calculating section 15 causes the display section 340 to display the calculated height.

The dimension calculating section 31 calculates, on the basis of the analysis result of the reference image data by the image analyzing section 9, a dimension of the portion of the measurement object S corresponding to the dimension measurement portion set by the correcting section 17. The dimension calculating section 31 causes the display section 340 to display the calculated dimension.

The inspecting section 18 inspects the measurement object S on the basis of the height of the portion corresponding to the height measurement point of the measurement object S calculated by the height calculating section 15 and the allowable value corresponding to the height measurement point registered in the registering section 6. The inspecting section 18 inspects the measurement object S on the basis of the dimension of the portion corresponding to the dimension measurement portion of the measurement object S calculated by the dimension calculating section 31 and the allowable value corresponding to the dimension measurement portion registered in the registering section 6. For example, when the calculated height is within a range of a tolerance based on the design value, the inspecting section 18 determines that the measurement object S is a non-defective product. On the other hand, when the calculated height is outside the range of the tolerance based on the setting value, the inspecting section 18 determines that the measurement object S is a defective product.

The report preparing section 19 prepares a report on the basis of a result of the inspection by the inspecting section 18 and the reference image acquired by the measurement-image acquiring section 16. Consequently, the measurement operator can easily report the inspection result concerning the measurement object S to the measurement manager or the other users using the report.

(8) An Overall Flow of the Control System

FIGS. 10 to 14 are flowcharts for explaining an example of the three-dimensional measurement processing executed in the three-dimensional measuring device 400 shown in FIG. 1. A series of processing explained below is executed at a fixed cycle by the control section 310 and the control board 210 when a power supply of the three-dimensional measuring device 400 is in an ON state. In this example, as explained below, processing (processing in steps S110, S123, and the like explained below) for specifying coordinates of the portions of the measurement object S corresponding to the height measurement point and the reference point in the three-dimensional measurement processing is executed by the control board 210. The other processing is executed by the control section 310. However, the present invention is not limited to this. For example, all the kinds of processing of the three-dimensional measurement processing may be executed by either one of the control board 210 and the control section 310.

In an initial state, it is assumed that the power supply of the three-dimensional measuring device 400 is on in a state in which the measurement object S is placed on the placement plate 111 shown in FIG. 2. At this point, the selection screen 341 shown in FIG. 7 is displayed on the display section 340 shown in FIG. 1.

When the three-dimensional measurement processing is started, the control section 310 determines whether the setting mode is selected by operation of the operation section 330 by the user (step S100). More specifically, the control section 310 determines whether the setting button 341a shown in FIG. 7 is operated by the user.

Figure 14:
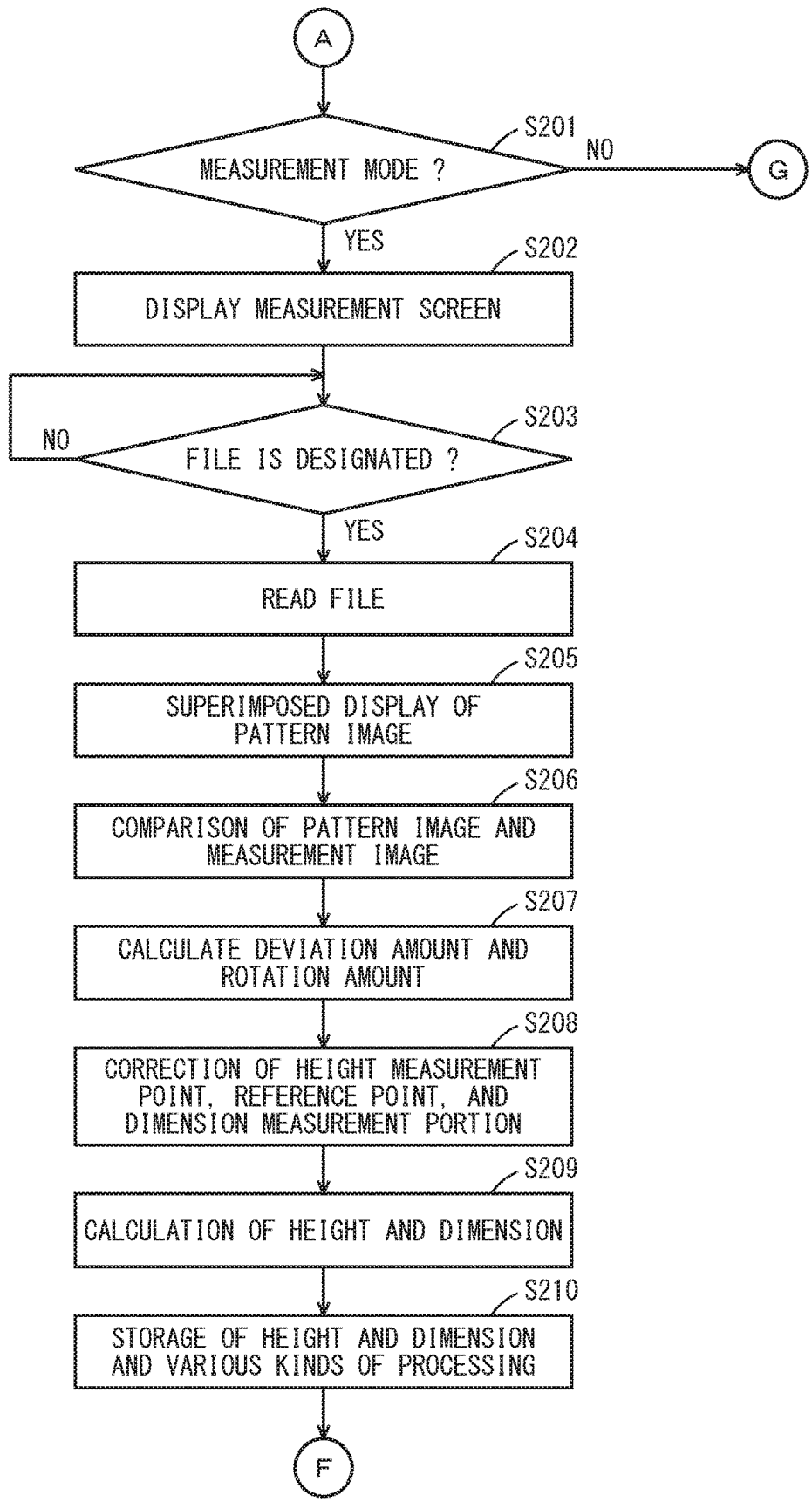
FIG. 14 is a flowchart showing the example of the three-dimensional measurement processing executed in the three-dimensional measuring device shown in FIG. 1.

When the setting mode is not selected, the control section 310 proceeds to processing in step S201 shown in FIG. 14 explained below. On the other hand, when the setting mode is selected, the control section 310 causes the display section 340 shown in FIG. 1 to display a setting screen 350 shown in FIG. 15 explained below (step S101). On the setting screen 350, a reference image of the measurement region V shown in FIG. 2 acquired at a fixed cycle by the imaging section 220 is displayed on a real-time basis.

In the three-dimensional measuring device 400 according to this embodiment, in order to realize a correcting function of the correcting section 17 shown in FIG. 9, it is necessary to set a pattern image and a search region in the setting mode. The pattern image means an image of a portion including at least the measurement object S in an entire region of a reference image displayed at a point in time designated by the user. The search region means a range (a range in an imaging visual field of the imaging section 220) in which, after the pattern image is set in the setting mode, a portion similar to the pattern image is searched in a measurement image in the measurement mode.

Therefore, the control section 310 determines whether a search region is designated by the operation of the operation section 330 by the user (step S102). When a search region is not designated, the control section 310 proceeds to processing in step S104 explained below. On the other hand, when a search region is designated, the control section 310 sets a search region by storing information concerning the designated search region in the storing section 320 (step S103).

Subsequently, the control section 310 determines whether a pattern image is designated by the operation of the operation section 330 by the user (step S104). When a pattern image is not designated, the control section 310 proceeds to processing in step S106 explained below. On the other hand, when a pattern image is designated, the control section 310 sets a pattern image by storing information concerning the designated pattern image in the storing section 320 (step S105). Note that the information concerning the pattern image includes information indicating a position of the pattern image in the reference image. Specific setting examples of the pattern image and the search region by the user are explained below.

Subsequently, the control section 310 determines whether a search region and a pattern image are set according to the processing in steps S103 and S105 (step S106). When at least one of a search region and a pattern image is not set, the control section 310 returns to the processing in step S102. On the other hand, when a search region and a pattern image are set, the control section 310 determines whether a setting command concerning height measurement is received (step S107). This determination processing is performed on the basis of, for example, the operation of the operation section 330 by the user.

Figure 13:
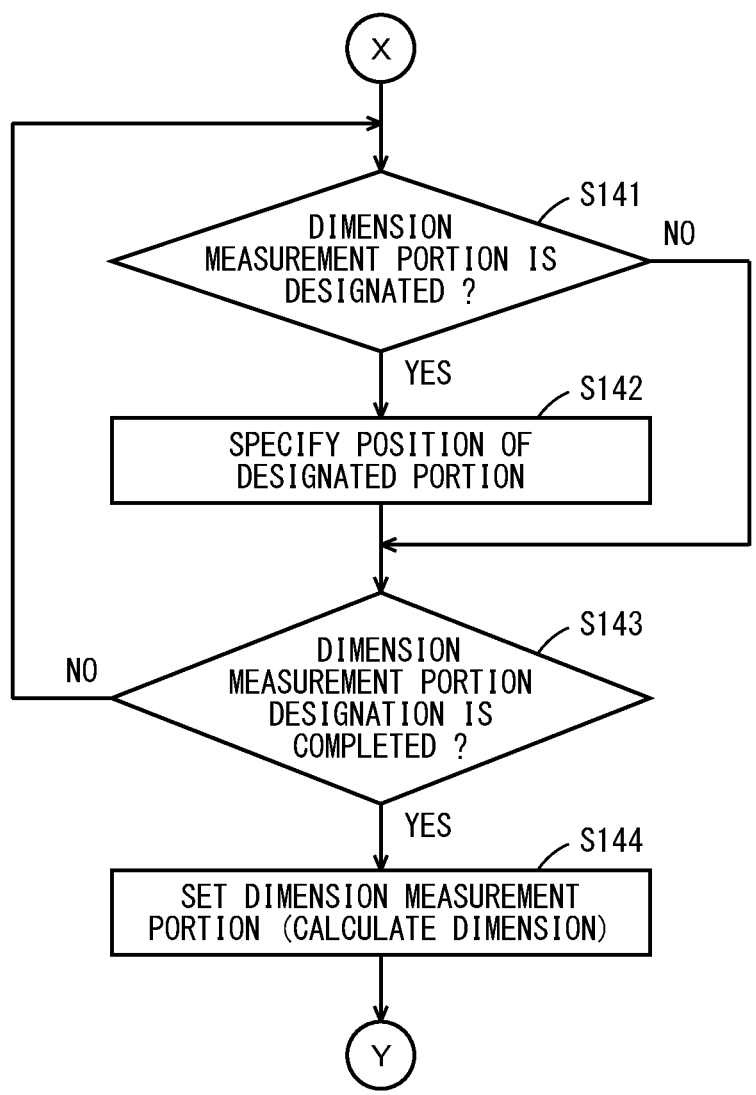
FIG. 13 is a flowchart showing the example of the three-dimensional measurement processing executed in the three-dimensional measuring device shown in FIG. 1.

When the setting command concerning height measurement is not received, the control section 310 proceeds to processing in step S141 shown in FIG. 13 explained below. On the other hand, when the setting instruction concerning height measurement is received, the control section 310 further determines whether the received setting command is a setting command for a reference plane (step S108).

A reference plane is set by the user designating one or a plurality of points as a reference point or reference points on the reference image displayed on the display section 340. When the setting command for a reference plane is received in step S108, the control section 310 determines whether designation of a point serving as a reference point is received on the reference image displayed on the display section 340 by the operation of the operation section 330 by the user (step S109). When the designation of the point is not received, the control section 310 proceeds to processing in the following step S111.

On the other hand, when the designation of a point is received, the control section 310 gives a plane coordinate (Ua, Va) specified by the designated point on the image to the control board 210 (see FIG. 8A).

As explained above, the imaging section 220 generates image data in the measurement region V on the basis of parallel light made incident through the telecentric optical system 281 shown in FIG. 2. Therefore, the plane coordinate (Xc, Yc) of the peculiar three-dimensional coordinate system corresponding to the plane coordinate (Ua, Va) on the image can be unconditionally calculated irrespective of a position in the Z-axis direction. The relation between the plane coordinate (Ua, Va) and the plane coordinate (Xc, Yc) is stored in the storing section 320 as the coordinate conversion information as explained above.

Further, as explained above, the measurement light emitted from the deflecting section 270 to the second light guide section 280 travels in parallel to the Z axis by the collimate lens 283 to be guided to the measurement region V. A component of the measurement light reflected by the measurement object S and returning to the deflecting section 270 travels in parallel to the Z axis from the measurement region V to the position of the collimate lens 283. Therefore, angles of the reflecting members 271b and 272b shown in FIG. 6 at the time when the measurement light is irradiated on the plane coordinate (Xc, Yc) of the peculiar three-dimensional coordinate system can be unconditionally calculated irrespective of a position in the Z-axis direction. The relation between the plane coordinate in the measurement region V and the angles of the reflecting members 271b and 272b is stored in the storing section 320 as the position conversion information as explained above.

Therefore, the control board 210 specifies, on the basis of the plane coordinate (Ua, Va), the coordinate conversion information, and the position conversion information, a coordinate of a point designated by irradiating, on the measurement region V, the measurement light passing the plane coordinate (Xc, Yc) of the peculiar three-dimensional coordinate system corresponding to the plane coordinate (Ua, Va) (step S110).

Specifically, the control board 210 adjusts the angles of the reflecting members 271b and 272b shown in FIG. 6 on the basis of the plane coordinate (Ua, Va), the coordinate conversion information, and the position conversion information and irradiate the measurement light parallel to the Z axis passing the plane coordinate (Xc, Yc) on the measurement region V. The control board 210 detects, with the reading sections 275 and 276 shown in FIG. 6, angles of the reflecting members 271b and 272b at this point. The control board 210 adjusts the positions of the movable sections 252a and 252b shown in FIG. 4 and adjusts the optical path length of the reference light such that the optical path length of the reference light and the optical path length of the measurement light are equal to or smaller than a fixed value. Further, the control board 210 calculates, on the basis of the light reception signal output from the light receiving section 232d shown in FIG. 3, the positions of the movable sections 252a and 252b shown in FIG. 4, and the deflecting directions of the measurement light by the reflecting members 271b and 272b shown in FIG. 6, a three-dimensional coordinate (Xc, Yc, Zc) of a portion on which the measurement light is irradiated on the measurement object S. The three-dimensional coordinate (Xc, Yc, Zc) specified in this way is given to the control section 310 from the control board 210 (see FIG. 8A).

Thereafter, the control section 310 determines whether the designation of the point serving as the reference point is completed by the operation of the operation section 330 by the user (step S111). When the designation of the point is not completed, the control section 310 returns to the processing in step S109. On the other hand, when the designation of a point is completed, the control section 310 performs setting of a reference plane on the basis of one or a plurality of coordinates (Xc, Yc, Zc) acquired in the processing in step S110 (step S112). In this example, on the basis of coordinates (Xc, Yc, Zc) corresponding to one or a plurality of reference points, information indicating coordinates of the reference plane, for example, plane coordinates (Xc, Yc) corresponding to the reference points or coordinates (Xc, Yc, Zc) corresponding to the reference points are stored in the storing section 320.

The information indicating the coordinates of the reference plane may include a reference plane constraint condition for determining the reference plane. The reference plane constraint condition includes a condition that, for example, the reference plane is parallel to a placing surface or the reference plane is parallel to another surface stored in advance. In the case of the reference plane constraint condition, when a coordinate (Xb, Yb, Zb) corresponding to one reference point is designated, a plane represented by Z=Zb is acquired as the reference plane.

After the processing in step S112 or when the setting command for a reference plane is not received in step S108, the control section 310 determines whether a received setting command is a setting command for a height measurement point (step S121).

When the received setting command is not the setting command for a height measurement point, the control section 310 acquires information concerning setting input by the user operating the operation section 330 shown in FIG. 1 and stores the information in the storing section 320 (step S130). Examples of the information acquired in step S130 include information such as the allowable value and an indicator and a comment that should be displayed on a measurement image during the measurement mode. Thereafter, the control section 310 proceeds to processing in step S126 explained below.

When the setting command received in step S121 is the setting command for a height measurement point, the control section 310 determines whether designation of a point serving as a height measurement point is received on the reference image displayed on the display section 340 by the operation of the operation section 330 by the user (step S122). When the designation of the point is not received, the control section 310 proceeds to processing in the following step S124.

On the other hand, when the designation of a point is received, as in step S110 explained above, the control section 310 gives a plane coordinate (Ua, Va) specified by the designated point on the image to the control board 210 (see FIG. 8A). Consequently, the control board 210 specifies, on the basis of the plane coordinate (Ua, Va), the coordinate conversion information, and the position conversion information, a coordinate of a point designated by irradiating, on the measurement region V, the measurement light passing the plane coordinate (Xc, Yc) of the peculiar three-dimensional coordinate system corresponding to the plane coordinate (Ua, Va) (step S123). The three-dimensional coordinate (Xc, Yc, Zc) specified in this way is given to the control section 310 from the control board 210 (see FIG. 8A).

Thereafter, the control section 310 determines whether the designation of a point serving as a height measurement point is completed by the operation of the operation section 330 by the user (step S124). When the designation of the point is not completed, the control section 310 returns to the processing in step S122.

On the other hand, when the designation of a point is completed, the control section 310 performs setting of a height measurement point by storing coordinates (Xc, Yc, Zc) of one or a plurality of height measurement points acquired in the processing in step S123 in the storing section 320 (step S125).

After processing in any one of steps S125 and S130 explained above and step S144 in FIG. 13, the control section 310 determines whether completion of the setting is instructed or new setting is instructed (step S126). When new setting is instructed, that is, when the completion of the setting is not instructed, the control section 310 returns to the processing in step S107.

On the other hand, when completion of the setting is instructed, the control section 310 registers, as registration information, kinds of information set in at least a part of the processing in steps S102 to S112, S121 to S125, and S130 explained above and processing in steps S141 to S144 explained below in association with one another (step S127). Thereafter, the three-dimensional measurement processing ends in the setting mode. A file of the registration information to be registered is saved in the storing section 320 after a specific file name is attached to the file by the user.

In step S127, when the reference plane is set by the processing in step S112 explained above, the control section 310 may calculate height of the height measurement point on the basis of the reference plane and the specified coordinate (Xc, Yc, Zc) and include a result of the calculation in the registration information. Note that, when the reference plane is already set at a point in time of step S125 explained above, in step S125, height of a portion corresponding to the height measurement point may be calculated on the basis of the set reference plane and the acquired coordinate (Xc, Yc, Zc). In this case, a result of the calculation may be displayed on the setting screen 350 (see FIG. 20 referred to below) as the height of the portion corresponding to the height measurement point.

When a setting command concerning height measurement is not received in step S107, the control section 310 determines that the received setting command is a setting command concerning measurement of a dimension. Then, the control section 310 determines whether designation of a dimension measurement portion is received on the reference image displayed on the display section 340 by the operation of the operation section 330 by the user (step S141). When the designation of the dimension measurement portion is not received, the control section 310 proceeds to processing in the following step S143. On the other hand, when the designation of the dimension measurement portion is received, the control section 310 specifies the position of the designated dimension measurement portion on the reference image (step S142). Specifically, the control section 310 specifies the position of an edge on the reference image of the designated dimension measurement portion.

Subsequently, the control section 310 determines whether the designation of the dimension measurement portion is completed by the operation of the operation section 330 by the user (step S143). When the designation of the dimension measurement portion is not completed, the control section 310 returns to the processing in step S141. On the other hand, when the designation of the dimension measurement portion is completed, the control section 310 performs setting of the dimension measurement portion by storing, in the storing section 320, a position or positions of one or a plurality of dimension measurement portions specified in the processing in step S142 (step S144) and proceeds to the processing in step S126 explained above.

In step S144, the control section 310 may calculate a dimension of a portion corresponding to the designated dimension measurement portion on the basis of reference image data. In this case, in step S127, the control section 310 may include a result of the calculation of the dimension in the registration information.

When the setting mode is not selected in step S100 explained above, the control section 310 determines whether the measurement mode is selected by the operation of the operation section 330 by the user (step S201). More specifically, the control section 310 determines whether the measurement button 341b shown in FIG. 7 is operated by the user. When the measurement mode is selected, the control section 310 causes the display section 340 shown in FIG. 1 to display a measurement screen 360 shown in FIG. 23 explained below (step S202). On the measurement screen 360, a measurement image in the measurement region V shown in FIG. 2 acquired at a fixed cycle by the imaging section 220 is displayed on a real-time basis.

Subsequently, the control section 310 determines whether a file of the registration information is designated by the operation of the operation section 330 by the user (step S203). Specifically, the control section 310 determines whether a filename of the registration information is designated by the user. When a file is not designated, the control section 310 stays on standby until designation of a file is received. On the other hand, when receiving designation of a file, the control section 310 reads the designated file of the registration information from the storing section 320 (step S204). Note that, when the designated file of the registration information is not stored in the storing section 320, the control section 310 may display, on the display section 340, information indicating that the designated file is absent.

Subsequently, the control section 310 acquires registered information concerning a pattern image from the read registration information and superimposes and displays the acquired pattern image on the measurement image displayed on the display section 340 (step S205). At this point, the control section 310 acquires a search region in addition to the pattern image. Note that, as explained above, the information concerning the pattern image also includes information indicating a position of the pattern image in the reference image. Therefore, the pattern image is superimposed and displayed on the measurement image in the same position as the position set in the setting mode.

The pattern image may be displayed semitransparent. In this case, the user can easily compare a currently captured measurement image of the measurement object S and the reference image of the measurement object S acquired during the setting mode. Then, the user can perform positioning work for the measurement object S on the placement plate 111.

Subsequently, the control section 310 performs comparison of the pattern image and the measurement image (step S206). Specifically, the control section 310 extracts, as a reference edge, an edge of the measurement object S in the pattern image and searches whether an edge having a shape corresponding to the reference edge is present in the acquired search region.

In this case, an edge portion of the measurement object S in the measurement image is considered to be most similar to the reference edge. When a portion of the measurement image most similar to the reference edge is detected, the control section 310 calculates how much the detected portion deviates from the reference edge on the image and calculates how much the detected portion rotates from the reference edge on the image (step S207).

Subsequently, the control section 310 acquires the registered information concerning the height measurement point, the reference point (the reference plane), and the dimension measurement portion from the read registration information and corrects the acquired information concerning the height measurement point, the reference point (the reference plane), and the dimension measurement portion on the basis of the calculated deviation amount and the calculated rotation amount (step S208). The processing in steps S206 to S208 is equivalent to the function of the correcting section 17 shown in FIG. 9. With this configuration, even when the measurement object in the corrected image is displaced or rotated with respect to the measurement object in the pattern image, it is possible to highly accurately and easily specify and correct the height measurement point, the reference point (the reference plane), and the dimension measurement portion.

Subsequently, the control section 310 calculates height of a portion of the measurement object S corresponding to the corrected height measurement point and calculates a dimension of a portion of the measurement object S corresponding to the corrected dimension measurement portion (step S209).

Specifically, concerning the height measurement point, the control section 310 gives a three-dimensional coordinate (Xc, Yc, Zc) of the corrected height measurement point to the control board 210 (see FIG. 8B). In this case, as in the processing in step S123 explained above, the control board 210 irradiates the measurement light passing the plane coordinate (Xc, Yc) on the measurement region V and specifies a three-dimensional coordinate (Xb, Yb, Zb) of a portion on which the measurement light is irradiated on the measurement object S. The control board 210 gives the specified three-dimensional coordinate (Xb, Yb, Zb) to the control section 310 (see FIG. 8B). The control section 310 calculates height of a portion corresponding to the height measurement point on the basis of the given three-dimensional coordinate (Xb, Yb, Zb) and the information such as the reference plane. Concerning the dimension measurement portion, the control section 310 extracts an edge of the measurement object S from the measurement image and specifies a portion of the measurement object S corresponding to the corrected dimension measurement portion to thereby calculate a dimension of the measurement object S on the basis of the measurement image and imaging magnification by the second light guide section 280 shown in FIG. 2.

Thereafter, the control section 310 stores a calculation result obtained in step S209 in the storing section 320 as a measurement result and performs various kinds of processing corresponding to registered other information (step S210). As the various kinds of processing corresponding to the registered other information, for example, when allowable values are included in the read registration information, inspection processing for determining whether a measurement result of height and a measurement result of a dimension are within ranges of tolerances set by the allowable values may be performed. Thereafter, the three-dimensional measurement processing ends in the measurement mode.

(9) An Operation Example in which the Setting Mode and the Measurement Mode are Used FIGS. 15 to 22 are diagrams for explaining an operation example of the three-dimensional measuring device 400 in the setting mode. In the following explanation, the user of the three-dimensional measuring device 400 is distinguished as the measurement manager and the measurement operator and explained.

Figure 15:
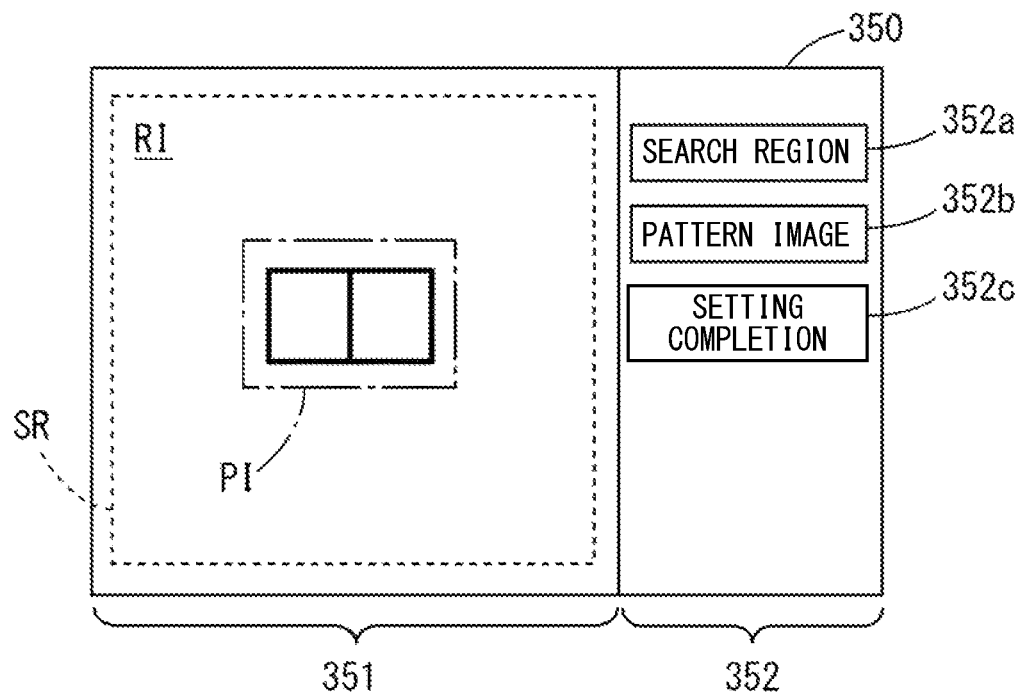
FIG. 15 is a diagram for explaining an operation example of the three-dimensional measuring device in a setting mode.

First, the measurement manager positions the measurement object S, which serves as a reference of height measurement, on the placement plate 111 and operates the setting button 341a shown in FIG. 7 using the operation section 330 shown in FIG. 1. Consequently, the three-dimensional measuring device 400 starts the operation in the setting mode. In this case, for example, as shown in FIG. 15, the setting screen 350 is displayed on the display section 340 shown in FIG. 1. The setting screen 350 includes an image display region 351 and a button display region 352. In the image display region 351, a currently captured image of the measurement object S is displayed in the image display region 351 as a reference image RI. In the diagrams of FIGS. 15 to 22 and the diagrams of FIGS. 23 to 25 referred to below, a contour indicating a shape of the measurement object S in the reference image RI and a measurement image MI explained below displayed in the image display region 351 is indicated by a thick solid line.

At a start point in time of the setting mode, in the button display region 352, a search region button 352a, a pattern image button 352b, and a setting completion button 352c are displayed. The measurement manager operates, for example, the search region button 352a to perform drag operation or the like on the image display region 351. Consequently, the measurement manager sets a search region SR as indicated by a dotted line in FIG. 15. The measurement manager operates, for example, the pattern image button 352b to perform the drag operation or the like on the image display region 351. Consequently, it is possible to set a pattern image PI as indicated by an alternate long and short dash line in FIG. 15.

Figure 16:
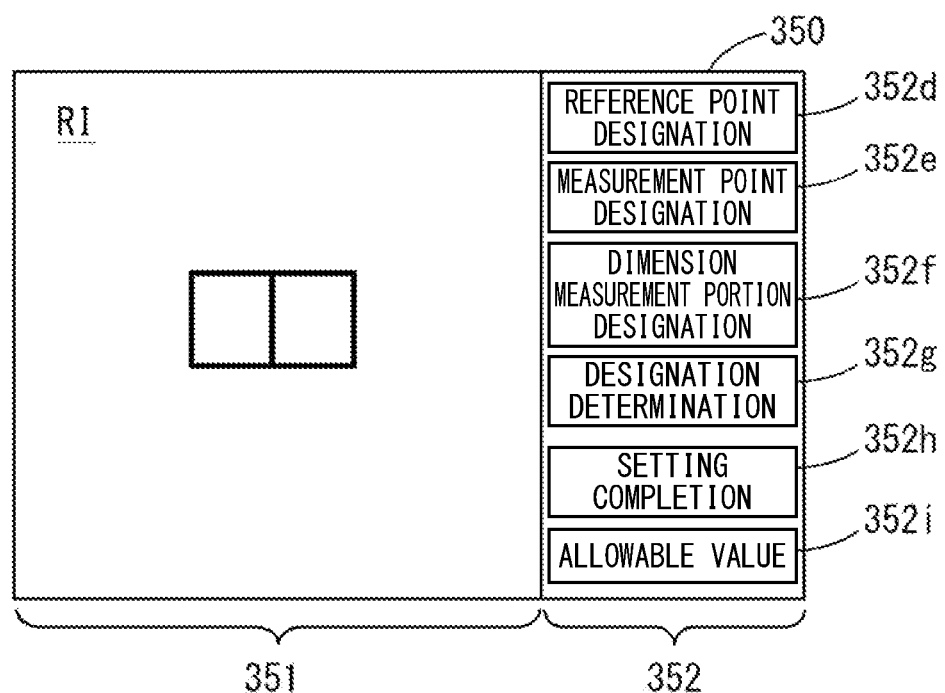
FIG. 16 is a diagram for explaining the operation example of the three-dimensional measuring device in the setting mode.
Figure 17:
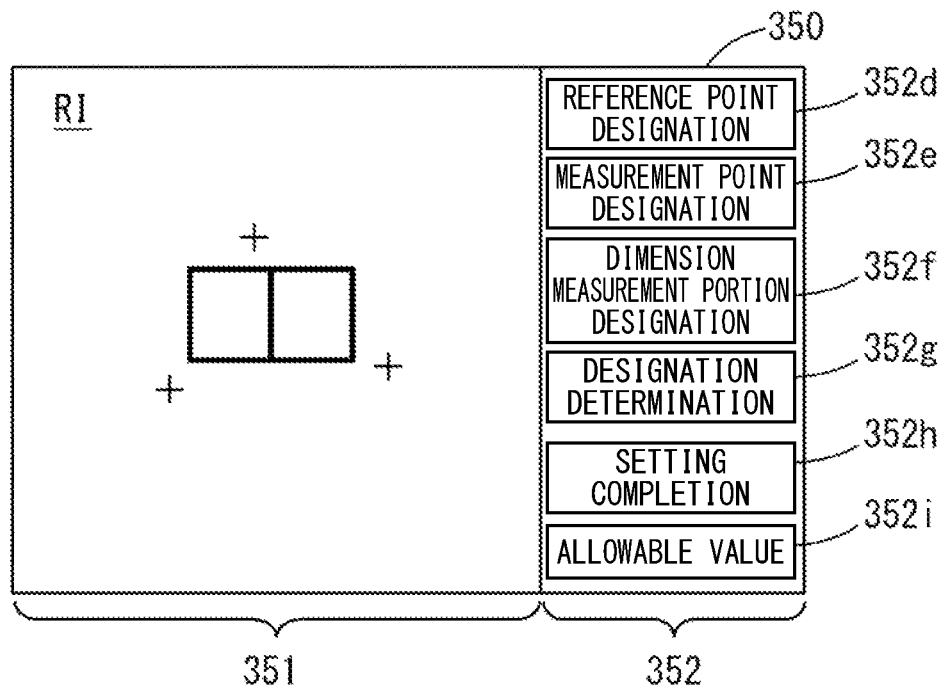
FIG. 17 is a diagram for explaining the operation example of the three-dimensional measuring device in the setting mode.
Figure 18:
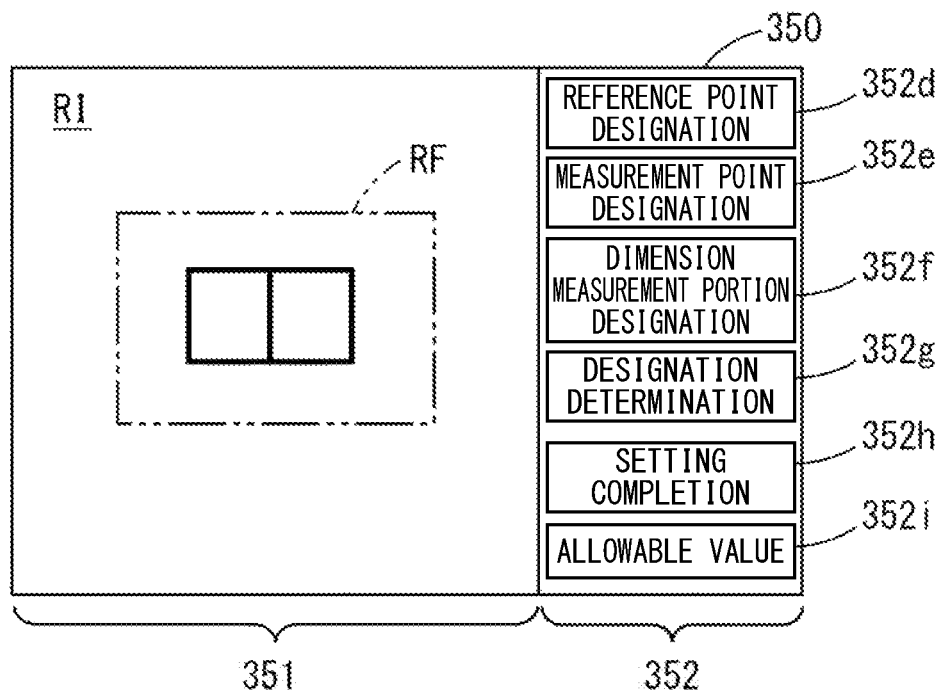
FIG. 18 is a diagram for explaining the operation example of the three-dimensional measuring device in the setting mode.
Figure 19:
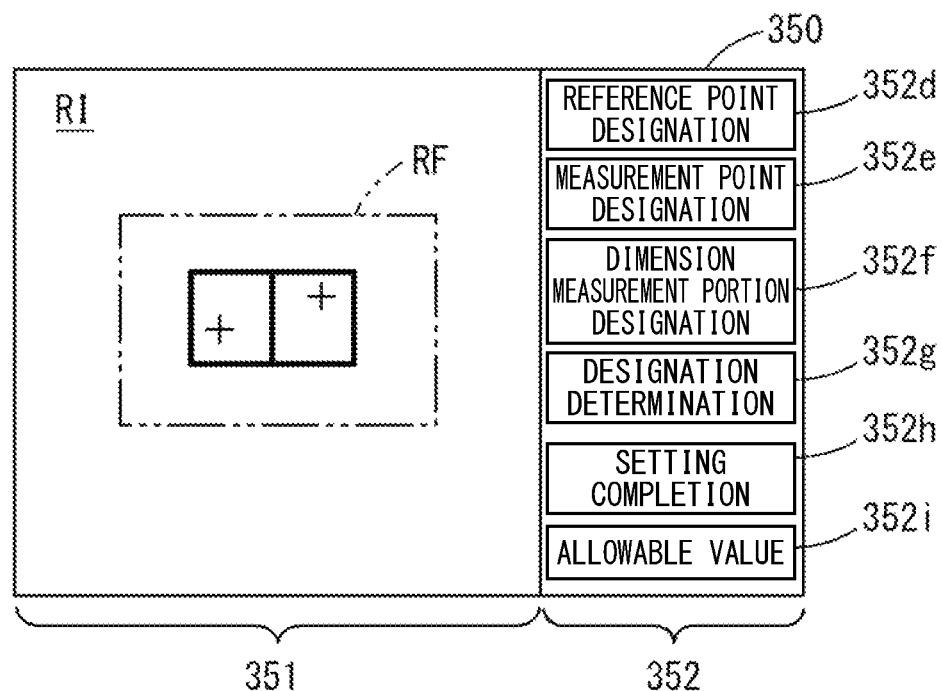
FIG. 19 is a diagram for explaining the operation example of the three-dimensional measuring device in the setting mode.

After setting the search region SR and the pattern image PI, the measurement manager operates the setting completion button 352c. Consequently, the setting of the search region SR and the pattern image PI is completed. A display form of the setting screen 350 is switched as shown in FIG. 16. Specifically, in the image display region 351, indicators indicating the set search region SR and the set pattern image PI are removed. In the button display region 352, a reference point designation button 352d, a height measurement point designation button 352e, a dimension measurement portion designation button 352f, a designation determination button 352g, a setting completion button 532h, and an allowable value button 352i are displayed instead of the search region button 352a, the pattern image button 352b and the setting completion button 352c shown in FIG. 15.

The measurement manager operates, for example, the reference point designation button 352d to perform click operation or the like on the image display region 351. Consequently, one or a plurality of (in this example, three) reference points are designated as indicated by "+" marks in FIG. 17. Thereafter, the measurement manager operates the designation determination button 352g. Consequently, a reference plane including the designated one or plurality of reference points is set. As indicated by an alternate long and two short dashes line in FIG. 18, an indicator indicating a reference plane RF set in the image display region 351 is displayed. At this point, the display of indicators indicating the reference points is removed. When four or more reference points are designated, all of the four or more reference points does not always included in the reference plane RF. In this case, the reference plane RF is set such that, for example, distances among the plurality of reference points are small as a whole. Similarly, when a reference plane constraint condition for determining a reference plane is decided, for example, when a condition that, for example, the reference plane is parallel to a placing surface or the reference plane is parallel to other surfaces stored in advance, is decided, when two or more reference points are designated, all of the two or more reference points do not always need to be included in the reference plane RF. Note that a plurality of reference planes RF may be set by repeating the operation of the reference point designation button 352d and the designation determination button 352g.

Subsequently, the measurement manger operates the height measurement point designation button 352e and performs click operation or the like on the image display region 351. Consequently, height measurement points are designated as indicated by "+" marks in FIG. 19. At this point, by further operating the allowable value button 352i, the measurement manager can set a design value and a tolerance as allowable values for each of the height measurement points.

Figure 20:
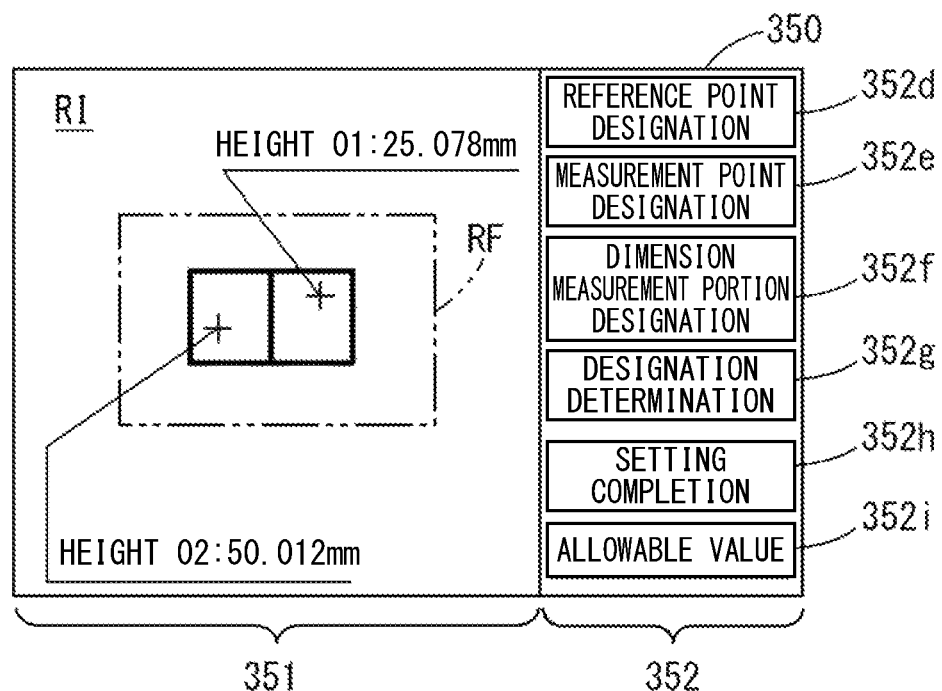
FIG. 20 is a diagram for explaining the operation example of the three-dimensional measuring device in the setting mode.
Figure 21:
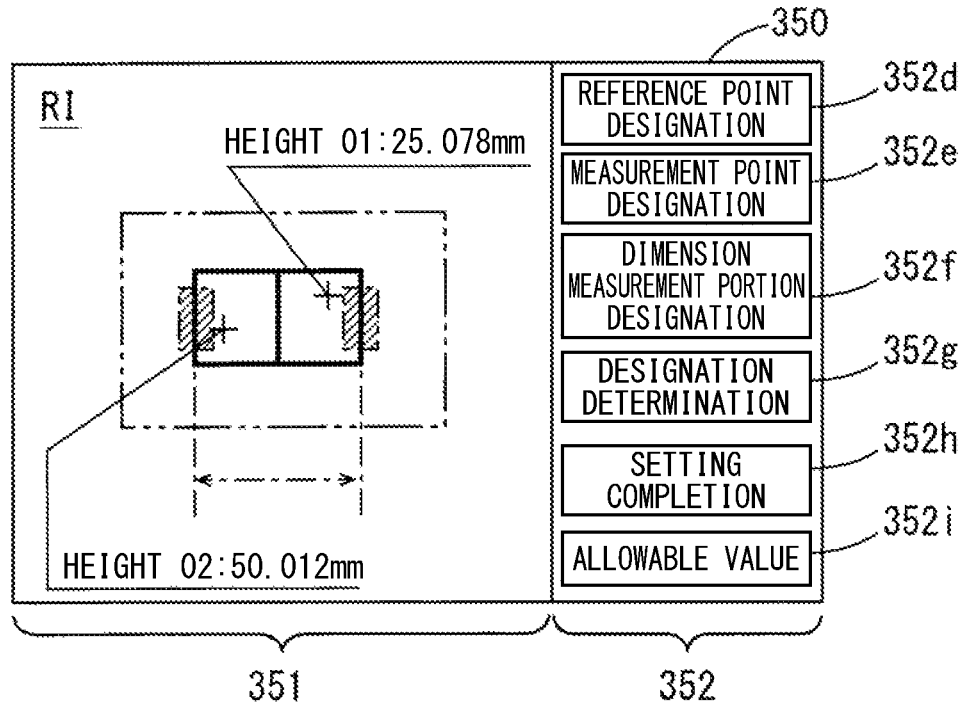
FIG. 21 is a diagram for explaining the operation example of the three-dimensional measuring device in the setting mode.

Thereafter, the measurement manager operates the designation determination button 352g. Consequently, designated one or plurality of (in this example, two) height measurement points are set. In this case, as shown in FIG. 20, heights with respect to the reference plane of portions of the measurement object S corresponding to the height measurement points are displayed on the image display region 351.

When a height measurement point is set, if a plurality of reference planes RF are set, selection of one reference plane RF may be received out of the plurality of reference planes RF set as the reference plane RF serving as a reference of the designated height measurement point.

Note that, in the setting mode, when the heights with respect to the reference plane of the portions of the measurement object S corresponding to the height measurement points are calculated, a color of the "+" marks may be changed to, for example, green to indicate that the heights of the portions of the measurement object S corresponding to the height measurement points can be calculated. On the other hand, when the heights are not calculated after the calculation processing for the heights with respect to the reference plane of the portions of the measurement object S corresponding to the height measurement points is performed, an error message such as "FAIL" may be displayed on the image display region 351. The color of the "+" marks may be changed to, for example, red to indicate that the heights of the portions of the measurement object S corresponding to the height measurement points cannot be calculated.

When a plurality of height measurement points are designated, it may be possible to designate measurement route information. It may be possible to set information indicating that, for example, a measurement route is set in the order of the designation of the plurality of height measurement points or a measurement route is set to be the shortest.

Figure 22:
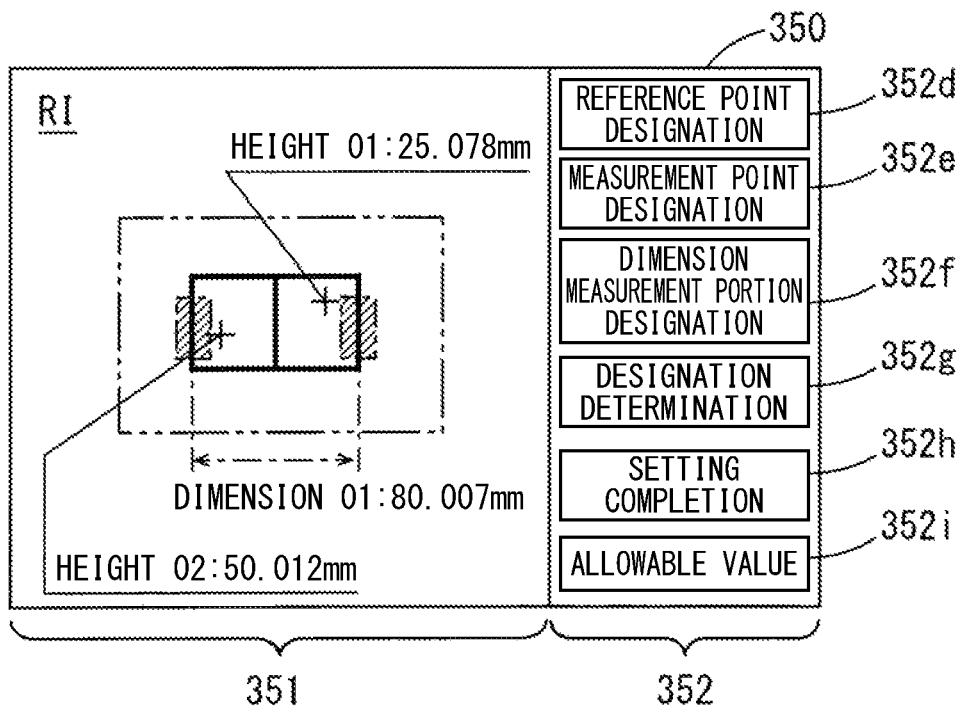
FIG. 22 is a diagram for explaining the operation example of the three-dimensional measuring device in the setting mode.

Subsequently, the measurement manager operates the dimension measurement portion designation button 352f and performs click operation, drag operation, and the like on the image display region 351. Consequently, as indicated by alternate long and short dash lines and hatchings in FIG. 21, dimension measurement portions of the measurement object S are designated. At this point, by further operating the allowable value button 352i, the measurement manager can set a design value and a tolerance as allowable values for each of the dimension measurement portions. Thereafter, the measurement manager operates the designation determination button 352g. Consequently, designated one or plurality of (in this example, one) dimension measurement portions are set. As shown in FIG. 22, the dimension of a portion of the measurement object S corresponding to the set dimension measurement portion is displayed on the image display region 351.

Lastly, the measurement manager operates the setting completion button 352h. Consequently, a series of information including the reference plane RF, the one or plurality of height measurement points, the one or plurality of dimension measurement portions, and the allowable values are stored in the storing section 320 as registration information in association with one another. At this point, a specific file name is given to the registration information. The file name may be capable of being set by the measurement manager.

Figure 23:
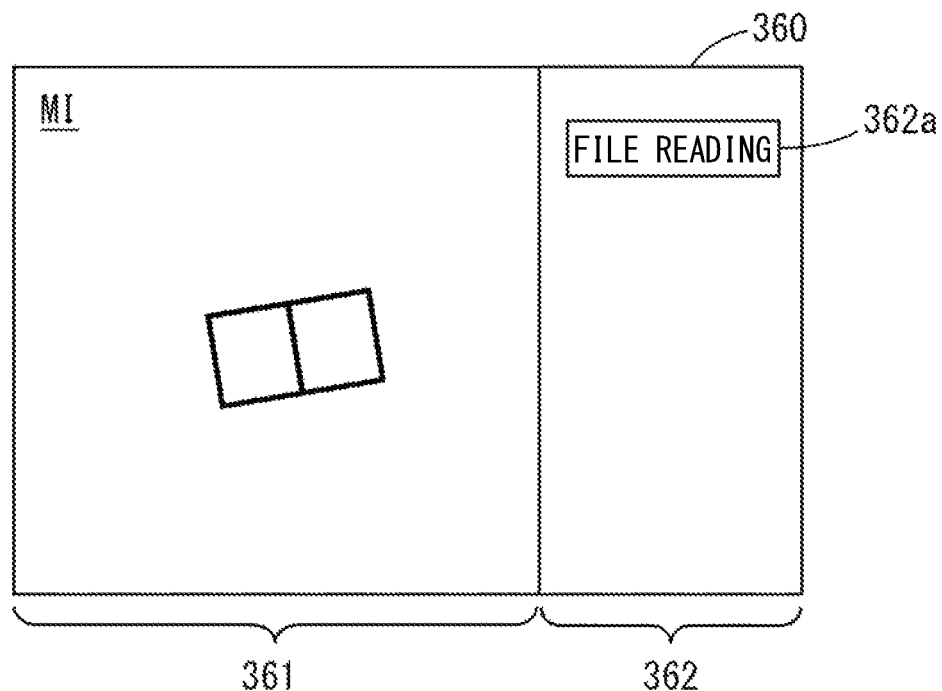
FIG. 23 is a diagram for explaining an operation example of the three-dimensional measuring device in a measurement mode.
Figure 24:
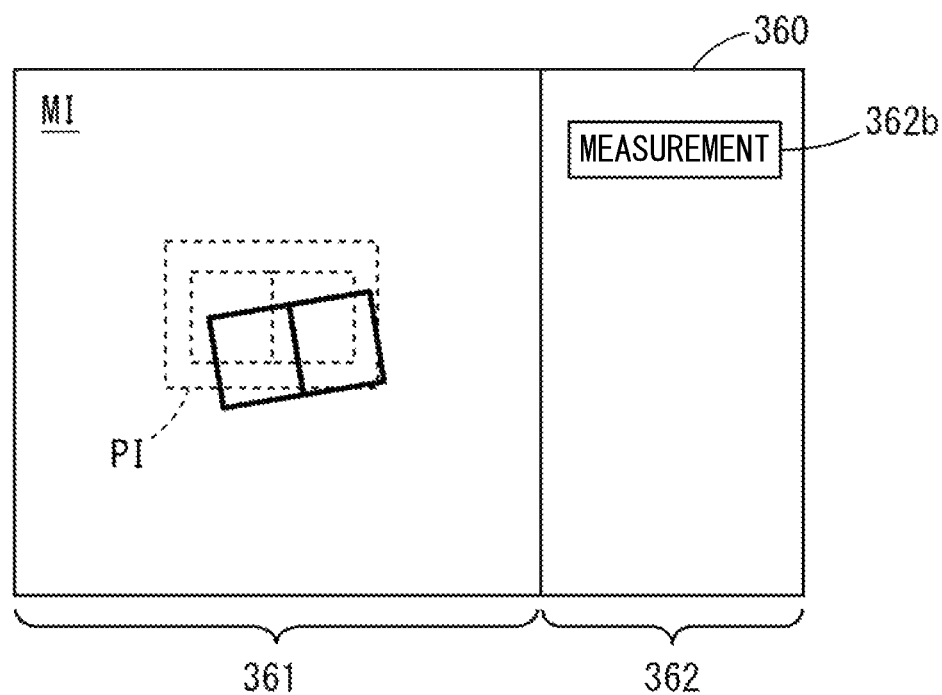
FIG. 24 is a diagram for explaining the operation example of the three-dimensional measuring device in the measurement mode.
Figure 25:
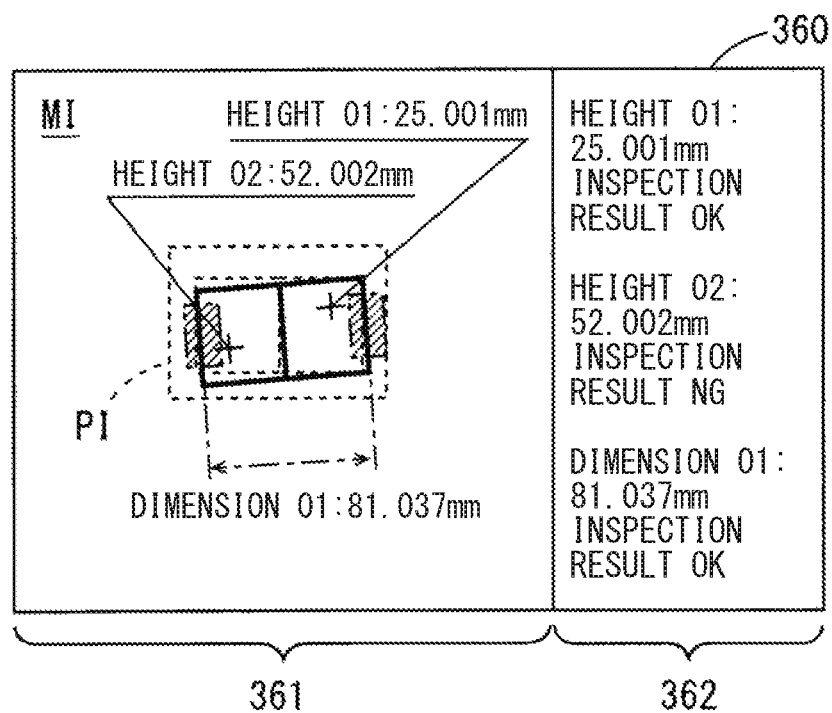
FIG. 25 is a diagram for explaining the operation example of the three-dimensional measuring device in the measurement mode.

FIGS. 23 to 25 are diagrams for explaining an operation example of the three-dimensional measuring device 400 in the measurement mode. The measurement operator positions the measurement object S on the placement plate 111 and operates the measurement button 341b shown in FIG. 7 using the operation section 330 shown in FIG. 1. Consequently, the three-dimensional device 400 starts operation in the measurement mode. In this case, for example, as shown in FIG. 23, the measurement screen 360 is displayed on the display section 340 shown in FIG. 1. The measurement screen 360 includes an image display region 361 and a button display region 362. In the image display region 361, a currently captured image of the measurement object S is displayed as the measurement image MI.

At a start point in time of the measurement mode, a file reading button 362a is displayed in the button display region 362. The measurement operator inputs a file name instructed by the measurement manager by operating the file reading button 362a. Consequently, registration information corresponding to the measurement object S placed on the placement plate 111 is read.

When the registration information is read, as shown in FIG. 24, the pattern image PI corresponding to the read registration information is superimposed and displayed on the measurement image MI of the image display region 361 in a semitransparent state. A measurement button 362b is displayed in the button display region 362. In this case, the measurement operator can position the measurement object S in a more appropriate position on the placement plate 111 while referring to the pattern image PI.

Thereafter, the measurement operator operates the measurement button 362b after performing the more accurate positioning work for the measurement object S. Consequently, heights of portions of the measurement object S corresponding to height measurement points of the read registration information are measured. At this point, when an allowable value corresponding to the height measurement points is included in the read registration information, pass/fail determination of the corresponding portions of the height measurement points is performed on the basis of the allowable value. Further, the dimension of a portion of the measurement object S corresponding to a dimension measurement portion of the read registration information is measured. At this point, when an allowable value corresponding to the dimension measurement portion is included in the registration information, pass/fail determination of the corresponding portion of the dimension measurement portion is performed on the basis of the allowable value.

As a result, as shown in FIG. 25, the heights of the portions of the measurement object S corresponding to the set height measurement points are displayed on the image display region 361. The heights of the portions of the measurement object S corresponding to the height measurement points are displayed on the button display region 362. A result of the pass/fail determination based on the allowable value is displayed as an inspection result.

Further, the dimension of the portion of the measurement object S corresponding to the set dimension measurement portion is displayed on the image display region 361. The dimension of the portion of the measurement object S corresponding to the dimension measurement portion is displayed on the button display region 362. A result of the pass/fail determination based on the allowable value is displayed as an inspection result.

(10) Effects

In the three-dimensional measuring device 400 according to this embodiment, the measurement manager designates a desired height measurement point in the setting mode, whereby the height of a portion of the measurement object S corresponding to a height measurement point designated in the measurement mode is selectively measured. The measurement manager designates a desired dimension measurement portion in the setting mode, whereby the dimension of a portion of the measurement object S corresponding to the dimension measurement portion designated in the measurement mode is selectively measured. Therefore, in order to measure a three-dimensional shape of a desired portion of the measurement object S, it is unnecessary to measure the height of the entire surface of the measurement object S. Therefore, it is also unnecessary to extract a necessary measurement value from a plurality of measurement values of heights. As a result, it is possible to easily measure the three-dimensional shape of the desired portion of the measurement object S in a short time.

In the measurement mode, height of the portion of the measurement object S corresponding to the designated height measurement point on the reference image is automatically calculated. A dimension of the portion of the measurement object S corresponding to the designated dimension measurement portion on the reference image is automatically calculated. Therefore, the skilled measurement manager designates the height measurement point and the dimension measurement portion on the reference image of the measurement object S in the setting mode. Consequently, in the measurement mode, even when the measurement operator is not skilled, it is possible to uniformly acquire calculation results of height and a dimension of the corresponding portion of the measurement object S. Consequently, it is possible to accurately and easily measure a shape of the desired portion of the measurement object S.

The measurement manager inputs allowable values corresponding to the height measurement point and the dimension measurement portion in the setting mode. Consequently, in the measurement mode, even when the measurement operator is not skilled, it is possible to uniformly acquire a determination result of pass/fail of the measurement object S. Consequently, it is possible to accurately and easily inspect the measurement object S.

The measurement manager designates one or a plurality of reference points and one or a plurality of height measurement points on the reference image of the measurement object S in the setting mode. Consequently, in the measurement mode, even when the measurement operator is not skilled, it is possible to uniformly acquire a calculation result of the height of the corresponding portion of the measurement object S based on the reference plane. Consequently, it is possible to accurately and easily measure a shape of the desired portion of the measurement object S.

Further, in a state in which the measurement object S is placed on the placement plate 111, a measurement result concerning the height of the measurement object S and a measurement result concerning the dimensions such as the width and the length of the measurement object S are calculated by the three-dimensional measurement processing at a time and stored in the storing section 320. Consequently, processing for associating the measurement result concerning the height and the measurement result concerning the dimensions in the horizontal direction each other is unnecessary. During the measurement of the height and the dimensions, it is unnecessary to move the measurement object S and bring a probe or the like into contact with the measurement object S. Therefore, even if the measurement object S is easily deformed by conveyance or contact, it is possible to accurately and quickly measure a desired dimension.

In this embodiment, the first illumination light is irradiated on the measurement region V from the transmission illumination section 190. The first illumination light passing the measurement region V is guided to the imaging section 220 through the telecentric optical system 281. Consequently, an image of the measurement object S disposed in the measurement region V is acquired. In this case, the size and the shape of the cross section of the first illumination light made incident on the imaging section 220 through the telecentric optical system 281 do not change according to a position in the optical axis direction of the telecentric optical system 281. Therefore, it is possible to accurately calculate a dimension of a designated dimension measurement portion irrespective of the height of the measurement object S disposed in the measurement region V.

With the configuration explained above, a portion passing a region other than the measurement object S in the first illumination light made incident on the measurement region V from the transmission illumination section 190 is made incident on the imaging section 220. Consequently, in the image acquired by the imaging section 220, an edge portion representing the outer edge of the measurement object S like a silhouette clearly appears. Therefore, since the edge of the outer edge of the measurement object S can be accurately extracted, it is possible to more accurately calculate the dimension of the designated dimension measurement portion. The edge of the outer edge of the measurement object S is accurately extracted. Consequently, when the pattern image and the measurement image are compared in step S206 explained above, it is possible to accurately search for an edge having a shape corresponding to a reference edge in the search region.

As explained above, the traveling direction of the measurement light made incident on the second light guide section 280 from the deflecting section 270 is converted into the direction parallel to the optical axis of the telecentric optical system 281 by the collimate lens 283. Thereafter, the measurement light is guided to the measurement region V through the telecentric optical system 281. Consequently, in the measurement region V, the measurement light is irradiated in a fixed direction orthogonal to the placement plate 111. Therefore, it is possible to uniformly irradiate the measurement light on any position of the measurement object S. Therefore, fluctuation is prevented from occurring in measurement accuracy in a plurality of portions of the measurement object S.

The transparent glass plate is used as the placement plate 111. In this case, it is possible to further flatten the placement surface on the placement plate 111 on which the measurement object S is placed. Consequently, the height of the measurement object S is not affected by the placement surface. Therefore, it is possible to highly accurately calculate height of the portion of the measurement object S corresponding to the designated height measurement point.

As explained above, the wavelength of the measurement light irradiated on the portion of the measurement object S corresponding to the height measurement point and the wavelengths of the first and second illumination lights irradiated on the measurement region V are different from each other. The imaging section 220 is capable of outputting light reception signals corresponding to the wavelengths of the first and second illumination lights and is configured to be incapable of outputting a light reception signal corresponding to the wavelength of the measurement light. In this case, a light spot of the measurement light does not appear in the image acquired by the imaging section 220. Consequently, when the dimension of the portion of the measurement object S corresponding to the dimension measurement portion is measured using the image acquired by the imaging section 220, a measurement error due to a light spot of the measurement light does not occur. Therefore, it is possible to execute the calculation of height and the calculation of a dimension in parallel while maintaining high measurement accuracy. Consequently, it is possible to reduce a time for the shape measurement of the measurement object S.

In the three-dimensional measuring device 400 explained above, the second illumination light is irradiated on the measurement region V from the epi-illumination section 290 provided in the measurement head 200. In this case, the second illumination light reflected on the surface of the measurement object S is guided to the imaging section 220, whereby, it is possible to acquire an image representing the surface shape of the measurement object S. Consequently, it is possible to detect an edge on the surface of the measurement object S. Therefore, a range in which dimension measurement is possible is expanded.

Figure 26A:
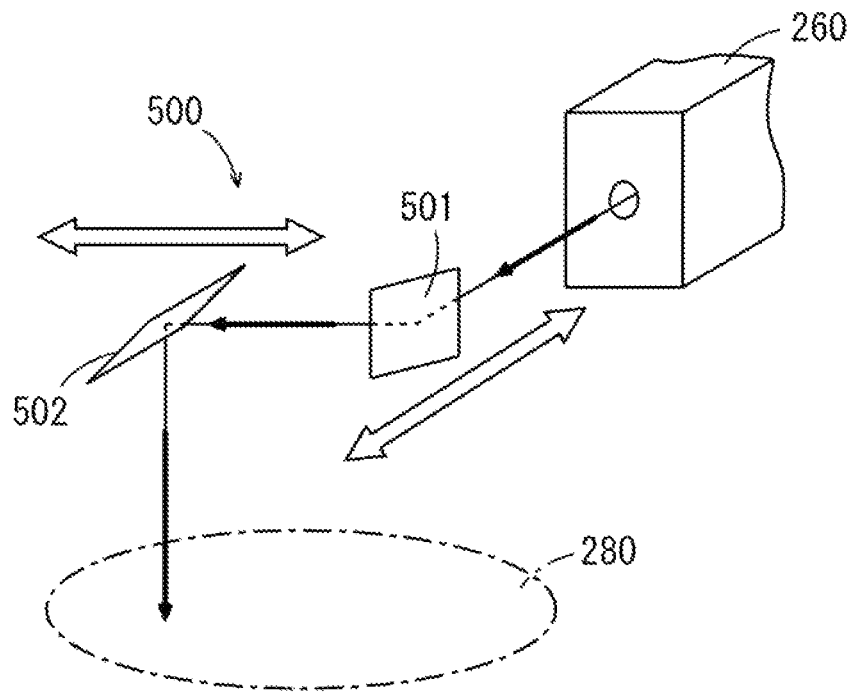
FIG. 26A is a schematic perspective view showing a part of the configuration of a deflecting section according to another embodiment and FIG. 26B is a schematic plan view of the deflecting section according to the other embodiment.
Figure 26B:
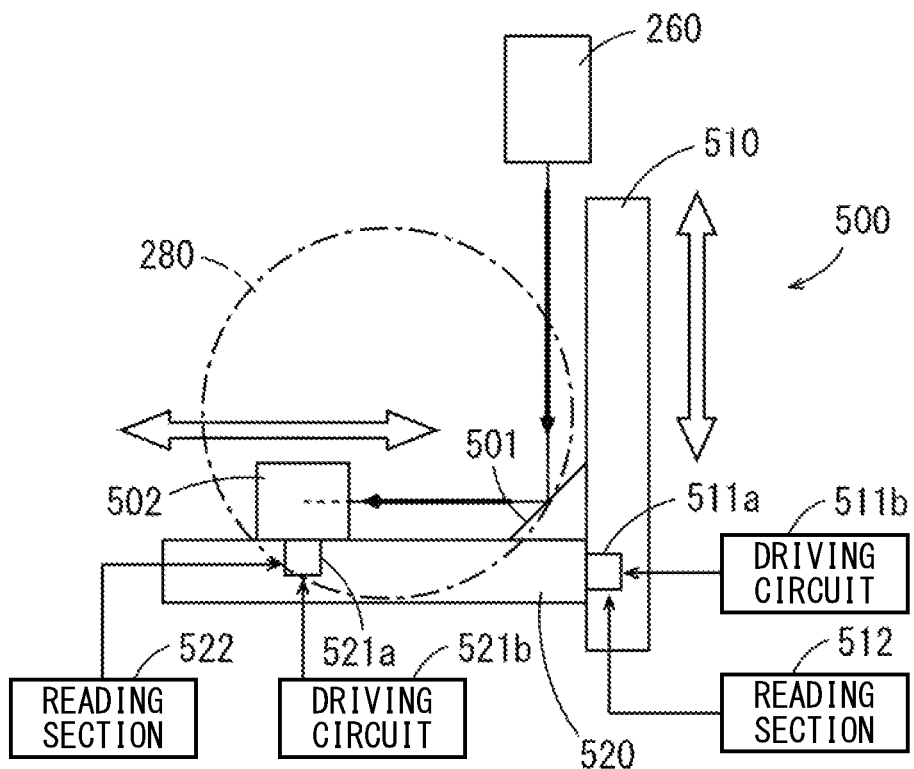

(11) Other Embodiments (a) In the embodiment explained above, the deflecting section 270 deflects, with the two reflecting sections 271 and 272, the measurement light from the focusing section 260 to the direction corresponding to the height measurement point. However, the present invention is not limited to this. The deflecting section may have a configuration and operation explained below. FIG. 26A is a schematic perspective view showing a part of the configuration of a deflecting section according to another embodiment and FIG. 26B is a schematic plan view of the deflecting section according to the other embodiment. In FIGS. 26A and 26B, the measurement light emitted from the focusing section 260 to a deflecting section 500 is indicated by a thick arrow.

As shown in FIG. 26A, the deflecting section 500 in this example includes a first reflecting member 501 and a second reflecting member 502. As shown in FIG. 26B, the deflecting section 500 in this example further includes a first supporting member 510, driving sections 511a and 521a, driving circuits 511b and 521b, reading sections 512 and 522, and a second supporting member 520.

The first supporting member 510 is orthogonal to the optical axis of the telecentric optical system 281 (FIG. 2) provided in the second light guide section 280 and extends in parallel to the traveling direction of the measurement light emitted from the focusing section 260. The second supporting member 520 extends in a direction orthogonal to the optical axis of the telecentric optical system 281 (FIG. 2) and the first supporting member 510 and is supported by the first supporting member 510 to be capable of moving in the longitudinal direction of the first supporting member 510.

The first reflecting member 501 is attached to the second supporting member 520 to reflect the measurement light emitted from the focusing section 260 to a direction parallel to the longitudinal direction of the second supporting member 520. On the other hand, the second reflecting member 502 is supported by the second supporting member 520 to reflect the measurement light reflected by the first reflecting member 501 toward the second light guide section 280 in parallel to the optical axis of the telecentric optical system 281 (FIG. 2) and to be capable of moving in the longitudinal direction of the second supporting member 520.

The driving section 511a is, for example, a voice coil motor and moves the second supporting member 520 in the longitudinal direction of the first supporting member 510. The driving section 521a is, for example, a voice coil motor and moves the second reflecting member 502 in the longitudinal direction of the second supporting member 520.

With such a configuration, in the deflecting section 500 in this example, as indicated by white arrows in FIGS. 26A and 26B, the first reflecting member 501 and the second reflecting member 502 move in two directions orthogonal to each other in a plane orthogonal to the optical axis of the second light guide section 280. Consequently, it is possible to irradiate the measurement light from above toward a desired position in the measurement region V. Therefore, in the measurement region V, the measurement light is irradiated in a fixed direction orthogonal to the placement plate 111. Therefore, it is possible to uniformly irradiate the measurement light on any position of the measurement object S.

In this case, it is unnecessary to provide the collimate lens 283 shown in FIG. 2 above the half mirror 282 in the second light guide section 280. In this example, if high measurement accuracy is not required concerning the dimension of the measurement object S, the telecentric optical system 281 shown in FIG. 2 may be not provided.

The driving circuit 511b is connected to the control board 210 and drives the driving section 511a on the basis of the control by the control board 210. The driving circuit 521b is connected to the control board 210 and drives the driving section 521a on the basis of the control by the control board 210. The reading sections 512 and 522 are, for example, optical linear encoders. The reading section 512 reads a movement amount of the second supporting member 520 by the driving section 511a to thereby detect a relative position of the second supporting member 520 with respect to the first supporting member 510 and gives a result of the detection to the control board 210. The reading section 522 reads a movement amount of the second reflecting member 502 by the driving section 521a to thereby detect a relative position of the second reflecting member 502 with respect to the second supporting member 520 and gives a result of the detection to the control board 210.

In this case, the deflection-state acquiring section 7 shown in FIG. 9 acquires the relative position of the second supporting member 520 with respect to the first supporting member 510 from the reading section 512 and acquires the relative position of the second reflecting member 502 with respect to the second supporting member 520 from the reading section 522. Therefore, the detecting section 8 shown in FIG. 9 detects, on the basis of the information acquired by the deflection-state acquiring section 7, a relative position of the first reflecting member 501 with respect to the first supporting member 510 and the relative position of the second reflecting member 502 with respect to the second supporting member 520. Consequently, the control board 210 can specify an irradiation position of the measurement light parallel to the Z axis on a plane coordinate formed by the X axis and the Y axis.

The coordinate calculating section 13 shown in FIG. 9 calculates a three-dimensional coordinate (Xc, Yc, Zc) of the irradiation position of the measurement light on the measurement object S on the basis of the relative position of the first reflecting member 501 with respect to the first supporting member 510 and the relative position of the second reflecting member 502 with respect to the second supporting member 520 detected by the detecting section 8 and the distance information calculated by the distance-information calculating section 12.

Note that, in the example shown in FIG. 26, the driving sections 511a and 521a may be configured by other driving mechanisms such as stepping motors or piezoelectric motors instead of the voice coil motors.

(b) In the embodiment, the wavelengths of the lights for the measurement light and the reference light generated in the light emitting section 231 shown in FIG. 2 and the wavelengths of the first and second illumination lights emitted from the transmission illumination section 190 and the epi-illumination section 290 are different. However, the present invention is not limited to this. At least a part of the wavelengths of the measurement light and the reference light and at least a part of the wavelengths of the first and second illumination lights may be the same. The imaging section 220 shown in FIG. 2 may be capable of outputting a light reception signal corresponding to the wavelength of the measurement light together with the lights having the wavelengths of the first and second illumination light.

In this case, alight spot of the measurement light appears in the image acquired by the imaging section 220. Consequently, it is possible to calculate a three-dimensional coordinate (Xc, Yc, Zc) of an irradiation position of the measurement light on the measurement object S on the basis of an image of the light spot acquired by the imaging section 220 and the light reception signal output from the light receiving section 232d shown in FIG. 4.

Specifically, in the setting mode and the measurement mode, the detecting section 8 shown in FIG. 9 can detect a plane coordinate of the light spot indicating an irradiation position on the reference image of the measurement light on the basis of the analysis result of the image analyzing section 9 shown in FIG. 9. Therefore, the coordinate calculating section 13 shown in FIG. 9 can calculate a three-dimensional coordinate (Xc, Yc, Zc) of an irradiation position of the measurement light on the measurement object S on the basis of the plane coordinate detected by the detecting section 8 and the distance information calculated by the distance-information calculating section 12.

Figure 27:
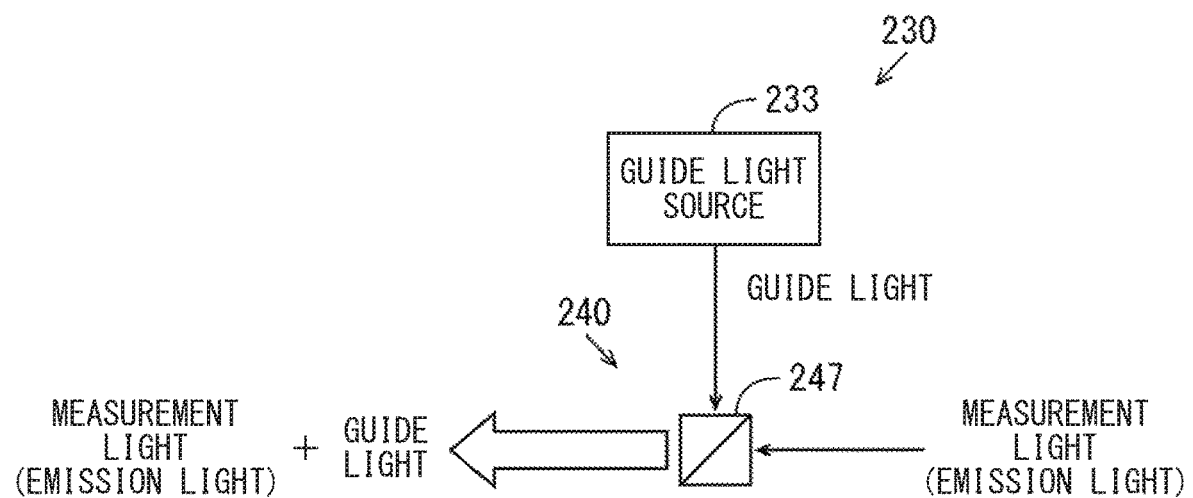
FIG. 27 is a schematic diagram showing another configuration of an optical section of the three-dimensional measuring device.

(c) FIG. 27 is a schematic diagram showing another configuration example of the optical section 230 of the three-dimensional measuring device 400. As shown in FIG. 27, the optical section 230 further includes a guide light source 233 that emits, for example, light in a visible region. The light emitted by the guide light source 233 is referred to as guide light. The first light guide section 240 further includes a half mirror 247.

The half mirror 247 is disposed in a desired position on an optical path of measurement light output from the port 245*d* of the fiber coupler 245 shown in FIG. 2. The half mirror 247 superimposes the guide light emitted from the guide light source 233 and the measurement light output from the port 245*d* one on top of the other. Consequently, the guide light is scanned by the deflecting section 270 shown in FIG. 2 and irradiated on the measurement object S in a state in which the guide light is superimposed on the measurement light.

With this configuration, the user can easily recognize an irradiation position of light on the measurement object S from the deflecting section 270 by visually recognizing an irradiation position of the guide light on the measurement object S.

When the imaging section 220 shown in FIG. 2 is capable of outputting a light reception signal corresponding to the wavelength of the guide light, the imaging section 220 clearly images the guide light on the measurement object S together with the measurement light. Consequently, the user can easily recognize an irradiation position of the measurement light on the reference image and the measurement image of the measurement object S acquired by the imaging section 220. Note that, typically, the measurement light is infrared light having low coherency. Typically, the imaging section 220 cannot image the infrared light. Therefore, in this case, the imaging section 220 image the irradiation position of the guide light as the irradiation position of the measurement light.

In this example, the guide light source 233 and the half mirror 247 are provided such that the guide light overlaps the measurement light output from the port 245*d* of the fiber coupler 245. However, the present invention is not limited to this. The guide light source 233 and the half mirror 247 may be provided such that the guide light overlaps the emission light output from the light emitting section 231 shown in FIG. 2. In this case, the half mirror 247 is disposed in a desired position on an optical path of the emission light between the light emitting section 231 and the port 245*a* of the fiber coupler 245.

In this example, the guide light and the measurement light are superimposed one on top of the other by the half mirror 247. However, the present invention is not limited to this. Typically, the measurement light is infrared light having low coherency. The guide light includes light in a visible region. Therefore, for example, the guide light and the measurement light may be superimposed one on top of the other by a wavelength selective mirror such as a dichroic mirror that shows high reflectance to light having a wavelength smaller than a cutoff wavelength and shows high transmittance to light having a wavelength larger than the cutoff wavelength. The guide light and the measurement light may be superimposed one on top of the other by, for example, a fiber coupler and an optical fiber. In this case, the fiber coupler has a so-called 2×1 type configuration.

Figure 28:
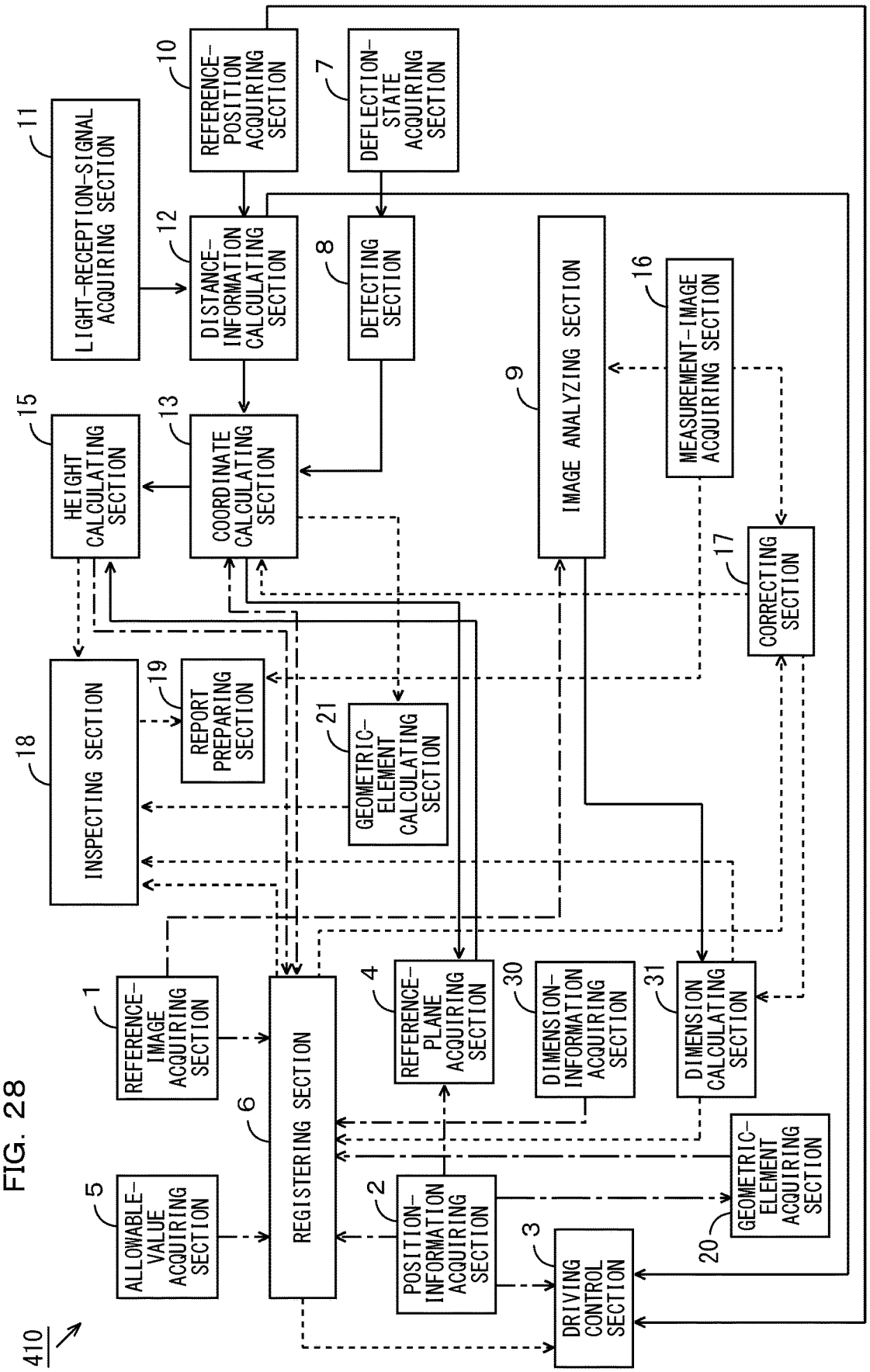
FIG. 28 is a block diagram showing another configuration of the control system of the three-dimensional measuring device.

(d) FIG. 28 is a block diagram showing another configuration example of the control system 410 of the three-dimensional measuring device 400. Concerning the control system 410 shown in FIG. 28, differences from the control system 410 shown in FIG. 9 are explained. As shown in FIG. 28, in this example, the control system 410 further includes a geometric-element acquiring section 20 and a geometric-element calculating section 21.

In the setting mode, the geometric-element acquiring section 20 receives designation of geometric elements concerning a position of a height measurement point acquired by the position-information acquiring section 2. The geometric elements concerning the position of the height measurement point are various elements that can be calculated on the basis of a coordinate of a portion of the measurement object S corresponding to the height measurement point. The geometric elements include, for example, flatness of a desired surface of the measurement object S and distances and angles of a plurality of portions of the measurement object S. Allowable values corresponding to the designated geometric elements may be further input to the allowable-value acquiring section 5.

The registering section 6 registers the geometric elements received by the geometric-element acquiring section 20 in association with the height measurement point. When the allowable values corresponding to the geometric elements are input to the allowable-value acquiring section 5, the registering section 6 registers the allowable values received by the allowable-value acquiring section 5 in association with the geometric elements. The coordinate calculating section 13 further calculates a coordinate related to the geometric elements registered in the registering section 6. The geometric-element calculating section 21 calculates, on the basis of the coordinate related to the geometric elements calculated by the coordinate calculating section 13, values of the geometric elements registered in the registering section 6.

In the measurement mode, the correcting section 17 further sets, in the measurement image data, the geometric elements corresponding to the registration information registered by the registering section 6. The coordinate calculating section 13 further calculates a coordinate related to the geometric elements set by the correcting section 17. The geometric-element calculating section 21 calculates, on the basis of the coordinate related to the geometric elements calculated by the coordinate calculating section 13, geometric elements set by the correcting section 17.

With this configuration, since the measurement manager designates the geometric elements in the setting mode, in the measurement mode, even when the measurement operator is not skilled, it is possible to uniformly acquire a calculation result of the geometric elements of the corresponding portion of the measurement object S. Consequently, it is possible to accurately and easily measure various geometric elements including flatness and an assembling dimension of the measurement object S.

When the allowable values corresponding to the geometric elements are registered in the registering section 6, the inspecting section 18 further inspects the measurement object S on the bass of the geometric elements calculated by the geometric-element calculating section 21 and the allowable values registered in the registering section 6. Specifically, when the calculated geometric elements are within ranges of tolerances based on design values, the inspecting section 18 determines that the measurement object S is a non-defective product. On the other hand, when the calculated geometric elements are outside the ranges of the tolerances based on the design values, the inspecting section 18 determines that the measurement object S is a defective product.

The report preparing section 19 prepares a report on the basis of a result of the inspection by the inspecting section 18 and the reference image acquired by the measurement-image acquiring section 16. In this case, inspection results of various geometric elements other than height are described in the report.

(e) The height calculating section 15 may calculate height of a portion of the measurement object S based on an origin in a peculiar three-dimensional coordinate system defined in the three-dimensional measuring device 400. In this case, the user can acquire the absolute value of the height of the portion of the measurement object S in the peculiar three-dimensional coordinate system. The height calculating section 15 may be capable of selectively operating in a relative value calculation mode for calculating the relative value of height based on a reference plane and an absolute value calculation mode for calculating the absolute value of height in a peculiar three-dimensional coordinate system. In the absolute value calculation mode, since the reference plane is unnecessary, the reference point may be not designated.

(f) In the setting mode, when height of the portion of the measurement object S corresponding to the height measurement point cannot be calculated, the height calculating section 15 may cause the display section 340 to display an error message such as "FAIL". In this case, by visually recognizing the display section 340, the measurement manager can recognize that height of the portion of the measurement object S corresponding to the height measurement point cannot be calculated. Consequently, the measurement manager can change the disposition of the measurement object S or the three-dimensional measuring device 400 or change the position of a height measurement point to be designated such that height of the portion of the measurement object S can be calculated.

(g) The three-dimensional measuring device 400 may be capable of inserting a drawing and a comment into the reference image acquired in the setting mode or the measurement image acquired in the measurement mode. Consequently, it is possible to record a measurement state of the measurement object S more in detail. The drawing and the comment inserted into the reference image may be registered as the registration information.

For example, a frame line indicating the search region set in the setting mode may be drawn in the reference image. In this case, in the measurement mode, the frame line is displayed on the measurement image. Consequently, in the measurement mode, it is easy for the measurement operator to place the measurement object S on the placement plate 111 such that the measurement object S fits inside the frame line displayed on the measurement image. As a result, it is possible to efficiently correct deviation of the measurement image data with respect to the reference image data.

(h) The reference-image acquiring section 1 may cause the display section 340 to display the acquired reference image in a bird's eye view fashion by performing image processing of the reference image. Similarly, the measurement-image acquiring section 16 may cause the display section 340 to display the acquired measurement image in a bird's eye view fashion by performing image processing of the measurement image.

(i) the embodiments explained above, the reference-image acquiring section 1 acquires the captured image of the measurement object S by the imaging section 220 as the reference image. However, the present invention is not limited to this. The reference-image acquiring section 1 may acquire, as the reference image, a CAD (Computer Aided Design) image of the measurement object S prepared in advance. When the CAD image is used as the reference image, the measurement manager can accurately designate a desired reference point and a desired height measurement point on the CAD image while recognizing a three-dimensional shape of the measurement object S.

(j) In the embodiments explained above, the measurement operator designates the file of the registration image during the start of the measurement mode. However, the invention is not limited to this. For example, an ID (identification) tag corresponding to the file of the registration information may be stuck to the measurement object S. In this case, the ID tag is imaged by the imaging section 220 together with the measurement object S during the start of the measurement mode, whereby the file of the registration information corresponding to the tag is automatically designated. With this configuration, the measurement operator does not need to designate the file of the registration information during the start of the measurement mode.

(k) In the embodiments explained above, the height of the measurement object S is calculated by the spectral interference system. However, the present invention is not limited to this. The height of the measurement object S may be calculated by another system such as a white interference system, a confocal system, a triangulation system, or a TOF (time of flight) system.

(l) In the embodiments explained above, the first light guide section 240 includes the optical fibers 241 to 244 and the fiber coupler 245. However, the present invention is not limited to this. The first light guide section 240 may include a half mirror instead of the optical fibers 241 to 244 and the fiber coupler 245.

(m) In the three-dimensional measuring device 400 according to the embodiments explained above, the measurement light is irradiated from above on the measurement region V on the placement plate 111, whereby the height in the up-down direction of the measurement object S is measured. The first illumination light is irradiated from below on the measurement region V, whereby the dimension of the measurement object S in the direction parallel to the placement plate 111 is measured. However, the present invention is not limited to this.

The three-dimensional measuring device 400 may be configured to irradiate the measurement light in a direction parallel to the placement plate 111 and from one side to the other side of the measurement region V (hereinafter referred to as first horizontal direction) and irradiate the first illumination light in a direction parallel to the placement plate 111 and from the other side to one side of the measurement region V (hereinafter referred to as second horizontal direction).

In this case, it is possible to calculate, on the basis of the measurement light from the measurement region V reflected by the measurement object S, distances (distances in a direction parallel to the placement plate 111) of portions of the measurement object S from a reference plane (a vertical plane) decided in advance orthogonal to the first and second horizontal directions. The imaging section 220 receives the first illumination light passing the measurement region V. Consequently, it is possible to calculate, on the basis of image data obtained by the imaging of the imaging section 220, dimensions of portions of the measurement object S parallel to a surface orthogonal to the first and second horizontal directions. Note that, in this example, the first illumination light does not need to be transmitted through the placement plate 111. Therefore, it is possible to use a non-translucent placement plate 111.

(12) A Correspondence Relation Between the Constituent Elements of the Claims and the Sections of the Embodiments An example of correspondence between the constituent elements of the claims and the sections of the embodiments is explained below. However, the present invention is not limited to the example explained below.

In the embodiments explained above, the measurement region V is an example of the measurement region, the measurement object S is an example of the measurement object, the three-dimensional measuring device 400 is an example of the three-dimensional measuring device, the position-information acquiring section 2 is an example of the height-measurement-information acquiring section, the dimension-information acquiring section 30 is an example of the dimension-information acquiring section, the imaging section 220 is an example of the imaging section, the measurement light is an example of the first light, and the light emitting section 231 is an example of the light emitting section.

The deflecting sections 270 and 500 are examples of the deflecting section, the light receiving section 232d is an example of the light receiving section, the driving control section 3 is an example of the driving control section, the detecting section 8 is an example of the detecting section, the height calculating section 15 is an example of the height calculating section, and the dimension calculating section 31 is an example of the dimension calculating section. The three-dimensional measuring device 400 is an example of the three-dimensional measuring device.

The first illumination light is an example of the second light, the transmission illumination section 190 is an example of the illuminating section, the telecentric optical system 281 is an example of the telecentric optical system, the reflecting member 271b is an example of the first reflecting member, the reflecting member 272b is an example of the second reflecting member, the driving sections 271a and 272a are examples of the rotating sections, and the collimate lens 283 is an example of the optical member.

The first supporting member 510 and the second supporting member 520 are examples of the supporting member, the first reflecting member 501 is an example of the first reflecting member, the second reflecting member 502 is an example of the second reflecting member, the driving sections 511a and 521a are examples of the moving sections, the setting section 110 is an example of the placement table, the placement plate 111 is an example of the placement plate, the reference-image acquiring section 1 is an example of the reference-image acquiring section, and the measurement-image acquiring section 16 is an example of the measurement-image acquiring section.

The registering section 6 is an example of the registering section, the correcting section 17 is an example of the correcting section, the allowable-value acquiring section 5 is an example of the allowable-value acquiring section, the inspecting section 18 is an example of the inspecting section, the geometric-element acquiring section 20 is an example of the geometric-element acquiring section, the geometric-element calculating section 21 is an example of the geometric-element calculating section, the coordinate calculating section 13 is an example of the coordinate calculating section, and the reference-plane acquiring section 4 is an example of the reference-plane acquiring section.

As the constituent elements of the claims, other various elements having the configurations or the functions described in the claims can also be used.

The present invention can be effectively used for various three-dimensional measuring devices.

What is claimed is:

1. A three-dimensional measuring device that measures a dimension of a measurement object disposed in a measurement region, the three-dimensional measuring device comprising:
   a height-measurement-information acquiring section configured to receive designation of a first position of a height measurement point in the measurement region;
   a dimension-measurement-information acquiring section configured to receive designation of a first designated part of region in the measurement region for measuring a dimension in a direction orthogonal to a height direction;
   a telecentric optical system;
   a camera configured to acquire, via the telecentric optical system, an image of the measurement object disposed in the measurement region;
   a light emitter configured to emit first light;
   a light deflector on which the first light is emitted from the light emitter, configured to deflect the first light emitted from the light emitter toward the measurement region;
   a light receiver configured to receive, via the telecentric optical system, the first light from the measurement object and generate a light reception signal associated with the first light received thereon;
   a driving controller configured to control at least one of position and rotating angle of the light deflector on the basis of the first position in the measurement region so that the first light deflected on the light deflector is irradiated on a portion of the measurement object corresponding to the first position in the measurement region;
   a height calculator configured to calculate height of the portion of the measurement object corresponding to the first position on the basis of the light reception signal generated by the light receiver when the first light deflected on the light deflector is irradiated on a portion of the measurement object corresponding to the first position in the measurement region by controlling the at least one of position and rotating angle of the light deflector; and
   a dimension calculator configured to calculate, on the basis of an edge extracted from the image of the measurement object acquired by the camera, a dimension associated with the edge in a portion of the measurement object corresponding to the first designated part of region in the measurement region.

2. The three-dimensional measuring device according to claim 1, further comprising:
   a placement table including a translucent placement plate on which the measurement object is placed, wherein the measurement region is a space on the placement plate and the telecentric optical system is provided above the placement plate to be opposed to the measurement region; and an illuminating source which irradiates a second light to travel from a position below the placement table toward the telecentric optical system through the translucent placement plate and the measurement region;

wherein the telecentric optical system is configured to guide the second light from the measurement region to the camera.

3. The three-dimensional measuring device according to claim 1, further comprising a detecting section which detects information concerning the at least one of position and rotating angle of the light deflector or an irradiation position of the first light on the image acquired by the camera, wherein the height calculator calculates the height of the portion of the measurement object corresponding to the first position on the basis of the information concerning the at least one of position and rotating angle of the light deflector or the irradiation position of the first light on the image detected by the detecting section in addition to the light reception signal generated by the light receiver.

4. The three-dimensional measuring device according to claim 1, wherein the light deflector includes:

a first reflector on which the first light is emitted from the light emitter, configured to reflect the first light emitted from the light emitter;

a second reflector on which the first light is emitted from the light emitter via the first reflector, configured to reflect the first light reflected by the first reflector and guide the first light to the telecentric optical system; and a first and a second rotating motors configured to respectively rotate the first and second reflectors, the information concerning the rotating angle of the light deflector for deflecting directions of the first light by the first and second reflectors, and the three-dimensional measuring device further comprises an optical member configured to convert a traveling direction of the first light deflected by the first and second reflectors into a direction parallel to an optical axis of the telecentric optical system and guide the first light to the telecentric optical system.

5. The three-dimensional measuring device according to claim 1, wherein the light deflector includes:

a supporting member;

a first reflector movably supported by the supporting member, on which the first light is emitted from the light emitter, configured to move in a first direction crossing an optical axis of the telecentric optical system and configured to reflect the first light emitted from the light emitter; and a second reflector movably supported by the supporting member, on which the first light is emitted from the light emitter via the first reflector, configured to move in a second direction crossing the optical axis of the telecentric optical system and different from the first direction and configured to reflect the first reflector to a direction parallel to the optical axis of the telecentric optical system and guide the first light to the telecentric optical system.

6. The three-dimensional measuring device according to claim 2, wherein the translucent placement plate is glass.

7. The three-dimensional measuring device according to claim 2, wherein wavelengths of the first and second lights are different from each other.

8. The three-dimensional measuring device according to claim 3, comprising:

a registering section configured to register a reference image acquired by the camera, a height measurement point on the reference image and a dimension measurement portion on the reference image, wherein the reference image is an image of the measurement object acquired by the camera as the reference image;

a memory configured to store the reference image, the first position corresponding to the height measurement point on the reference image and the first designated part of region corresponding to the dimension measurement portion on the reference image; and a correcting section configured to correct the first position and the first designated part of region on the basis of comparison of the reference image registered by the registering section and an image of the measurement object acquired by the camera as the measurement image;

wherein the driving controller configured to control at least one of position and rotating angle of the light deflector on the basis of the first position corrected by the correcting section so that the first light deflected on the light deflector is irradiated on a portion of the measurement object corresponding to the first position corrected by the correcting section;

the detecting section which detects information concerning the at least one of position and rotating angle of the light deflector or an irradiation position of the first light on the image acquired by the camera, the height calculator calculates the height of the portion of the measurement object corresponding to the first position corrected by the correcting section on the basis of the information concerning the at least one of position and rotating angle of the light deflector or the irradiation position of the first light on the image detected by the detecting section in addition to the light reception signal generated by the light receiver.

9. The three-dimensional measuring device according to claim 8, further comprising:

an allowable-value acquiring section configured to receive an input of an allowable value of the height of the portion of the measurement object corresponding to the height measurement point, receive an input of an allowable value of the dimension of the measurement object corresponding to the dimension measurement portion, and cause the registering section to register the received allowable values respectively in association with the height measurement point and the dimension measurement portion; and an inspecting section configured to inspect pass/fail of the measurement object on the basis of the height of the portion of the measurement object calculated by the height calculator and the dimension of the measurement object calculated by the dimension calculator and the allowable values registered by the registering section.

10. The three-dimensional measuring device according to claim 8, wherein the correcting section corrects the first position and the first designated part of region on the basis of comparison of a shape of an edge portion of the measurement object indicated by the reference image and a shape of an edge portion of the measurement object indicated by the measurement image.

11. The three-dimensional measuring device according to claim 8 wherein the height-measurement-information acquiring section is configured to further receive designation of one or a plurality of reference points on the reference image of the measurement object acquired by the camera, the registering section further registers the one or plurality of reference points received by the height-measurement-information receiver in association with the reference image, the correcting section further corrects the one or plurality of reference points on the basis of comparison of the reference image registered by the registering section and the measurement image acquired by the camera, the driving controller further controls at least one of position and rotating angle of the light deflector on the basis of each of the one or plurality of reference points corrected by the correcting section so that the first light deflected on the light deflector is irradiated on a portion of the measurement object corresponding to each of the one or plurality of reference points corrected by the correcting section, the three-dimensional measuring device further comprises:

a coordinate calculating section configured to calculate a respective coordinate corresponding to each of the one or plurality of reference points corrected by the correcting section on the basis of at least one of position and rotating angle of the light deflector or the irradiation position of the first light on the image detected by the detecting section and the light reception signal generated by the light receiver; and a reference-plane acquiring section configured to acquire a reference plane on the basis of the respective coordinate calculated by the coordinate calculating section, and the height calculator calculates the height of a portion of the measurement object corresponding to first position corrected by the correcting section on the basis of the reference plane acquired by the reference-plane acquiring section in addition to the information concerning the at least one of position and rotating angle of the light deflector or the irradiation position of the first light on the image detected by the detecting section and the light reception signal generated by the light receiver.

* * * * *